(12) United States Patent
Ogawa et al.

(10) Patent No.: US 11,599,292 B2
(45) Date of Patent: Mar. 7, 2023

(54) STORAGE SYSTEM AND LOAD DISTRIBUTION METHOD FOR STORAGE SYSTEM

(71) Applicant: Hitachi, Ltd., Tokyo (JP)

(72) Inventors: Naoki Ogawa, Tokyo (JP); Nobuyoshi Sakai, Tokyo (JP); Hibiki Saito, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 6 days.

(21) Appl. No.: 17/473,449

(22) Filed: Sep. 13, 2021

(65) Prior Publication Data

US 2022/0317911 A1    Oct. 6, 2022

(30) Foreign Application Priority Data

Mar. 31, 2021    (JP) .............................. JP2021-062015

(51) Int. Cl.
*G06F 11/20* (2006.01)
*G06F 3/06* (2006.01)

(52) U.S. Cl.
CPC .......... *G06F 3/0647* (2013.01); *G06F 3/0604* (2013.01); *G06F 3/067* (2013.01); *G06F 3/0659* (2013.01); *G06F 3/0664* (2013.01)

(58) Field of Classification Search
CPC ............. G06F 11/0793; G06F 11/0709; G06F 11/0712; G06F 11/073; G06F 11/076; G06F 11/0787; G06F 11/1451; G06F 11/1464; G06F 11/1469; G06F 11/2005; G06F 11/2007; G06F 11/201; G06F 11/2025; G06F 11/2028; G06F 11/2041; G06F 11/2048; G06F 11/2089; G06F 2201/81; G06F 2201/815; G06F 9/45558; G06F 9/5077; G06F 9/5083
See application file for complete search history.

(56) References Cited

FOREIGN PATENT DOCUMENTS

JP    2015-153370 A    8/2015

*Primary Examiner* — Yong J Choe
(74) *Attorney, Agent, or Firm* — Procopio, Cory, Hargreaves & Savich LLP

(57) ABSTRACT

Scale-out of a controller and application migration consider the application status, laws and rules of a scale-out destination, and a resource usage status. If an operation status exceeds a threshold value, an administrative server for a computer system of a storage system calculates a first index for each execution target, including an application, a virtual machine, or a container operating in the computer system, based on information about cost, credibility, or performance when the execution target is migrated to, and caused to operate in, another computer system, and indexing information indicating laws or rules applied to the computer system using indexes. A second index indicating, as a dimensionless quantity, the selection degree of another computer system as a migration destination of the execution target is acquired. A migration destination of the execution target is decided from among other computer systems based on the first index and/or the second index.

11 Claims, 23 Drawing Sheets

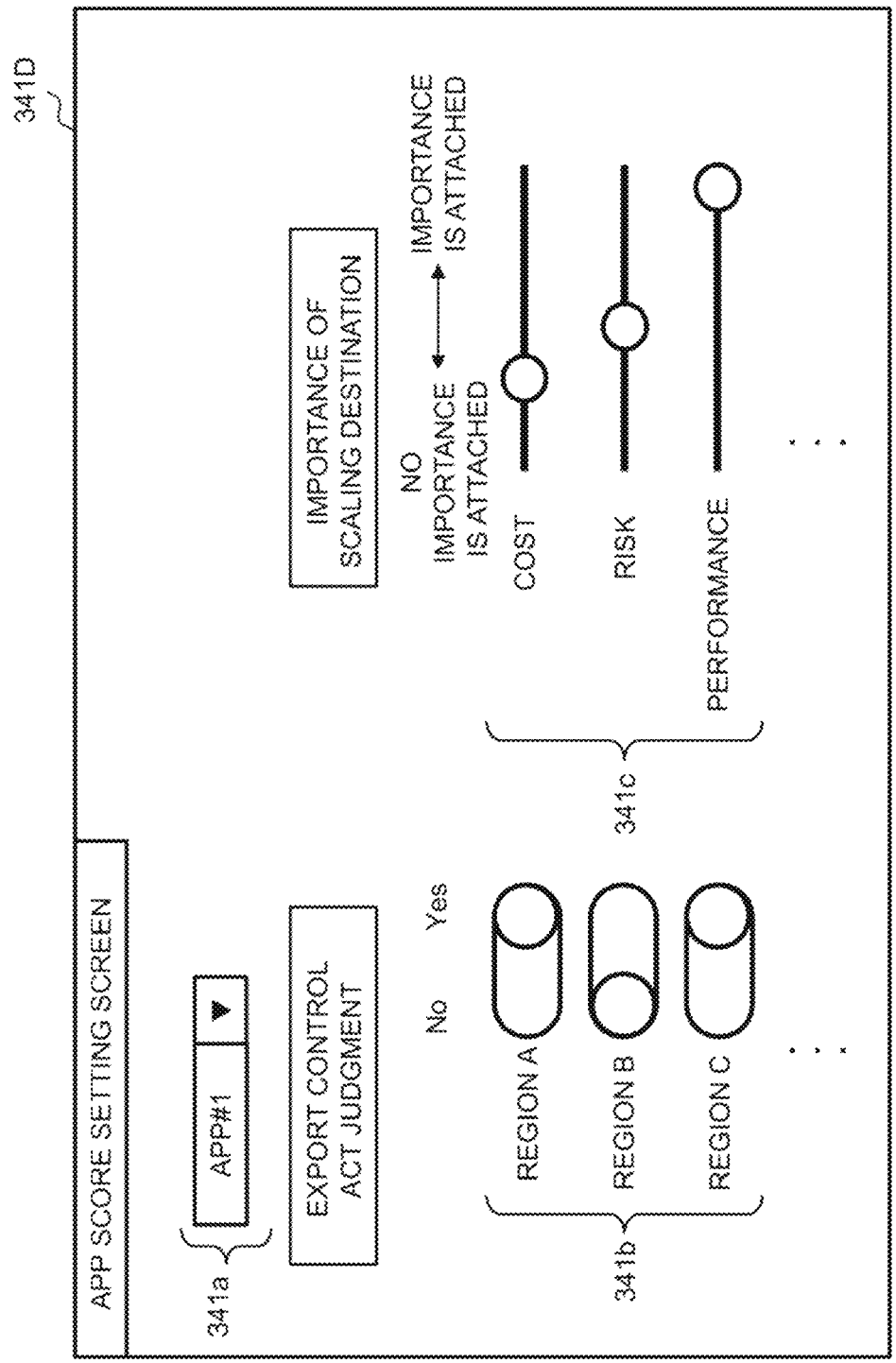

FIG. 5A

SCALING PERMISSION TABLE     412a

| APP# | REGION #0 | REGION #1 | REGION #2 | ... |
|---|---|---|---|---|
| 0 | 1 | 0 | 1 | ... |
| 1 | 1 | 1 | 0 | ... |
| 2 | 0 | 0 | 1 | ... |
| ... | ... | ... | ... | ... |

FIG. 5B

APP SCORE SETTING TABLE     412b

| | COST | RISK | | PERFORMANCE | |
|---|---|---|---|---|---|
| | SCORE #0 | SCORE #1 | SCORE #2 | SCORE #3 | SCORE #4 |
| APP# | COMMUNICATION COST | NATURAL DISASTER | INSPECTION | LATENCY | COMMUNICATION SPEED |
| 0 | 0.3 | 0.5 | 0.5 | 1 | 1 |
| 1 | 0.5 | 0.2 | 0.1 | 0.4 | 0.6 |
| 2 | 0 | 0.1 | 0.2 | 1 | 0.8 |
| ... | ... | ... | ... | ... | ... |

FIG. 5C

REGION SCORE STORAGE TABLE

412c

| REGION # | COST | RISK | | PERFORMANCE | |
|---|---|---|---|---|---|
| | SCORE #0 | SCORE #1 | SCORE #2 | SCORE #3 | SCORE #4 |
| | COMMUNICATION COST | NATURAL DISASTER | INSPECTION | LATENCY | COMMUNICATION SPEED |
| 0 | 0.2 | 0.6 | 0.2 | 0.5 | 0.5 |
| 1 | 0.6 | 0.6 | 0.1 | 0.8 | 0.4 |
| 2 | 0.1 | 0.1 | 0.3 | 0.7 | 0.9 |
| ... | ... | ... | ... | ... | ... |

APPLICABILITY JUDGMENT TABLE

| APP# | PARAMETER SHEET REGISTRATION | APPLICABILITY JUDGMENT | PERMISSION |
|---|---|---|---|
| 0 | REGISTERED | NON-APPLICABLE | 1(PERMITTED) |
| 1 | REGISTERED | APPLICABLE | 0(UNPERMITTED) |
| 2 | UNREGISTERED | - | 0(UNPERMITTED) |
| ... | ... | ... | ... |

FIG. 5E

REGION-BASED GROUP TABLE

| REGION # | GROUP # |
|---|---|
| 0 | 0 |
| 1 | 0 |
| 2 | 1 |
| 3 | 2 |
| ... | ... |

COUNTRY-BASED GROUP CLASSIFICATION TABLE

| COUNTRY CODE | GROUP # |
|---|---|
| AA | 0 |
| BB | 1 |
| CC | 2 |
| DD | 3 |
| EE | 0 |
| ... | ... |

RESOURCE USAGE STATUS HISTORY TABLE 412g

| APP# | SCALING DESTINATION REGION # | RESOURCE UTILIZATION RATE | | |
|---|---|---|---|---|
| | | CPU | MEMORY | ... |
| 0 | 0 | 30 | 30 | ... |
| 1 | 2 | 40 | 35 | ... |
| 2 | 1 | 35 | 30 | ... |
| ... | ... | ... | ... | ... |

FIG. 15
(a) DETERMINE INCLUSION
ACCORDING TO GeoIP OR THE LIKE
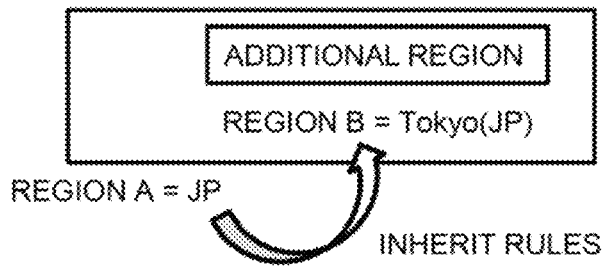
(b) DETERMINE EXISTENCE OF NEIGHBORING AREA
ACCORDING TO GeoIP OF THE LIKE
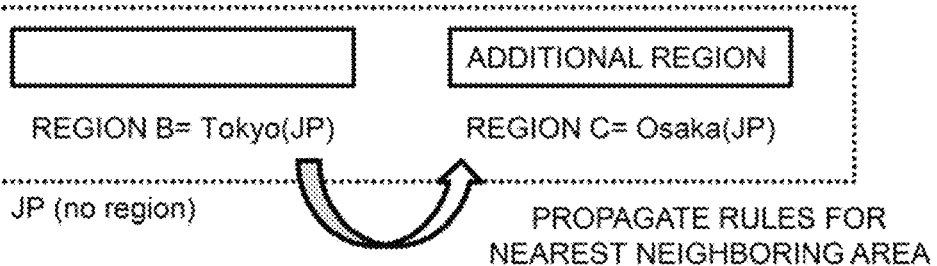
(c) DETERMINE INCLUSION AND EXISTENCE OF NEIGHBORING AREA
ACCORDING TO GeoIP OF THE LIKE
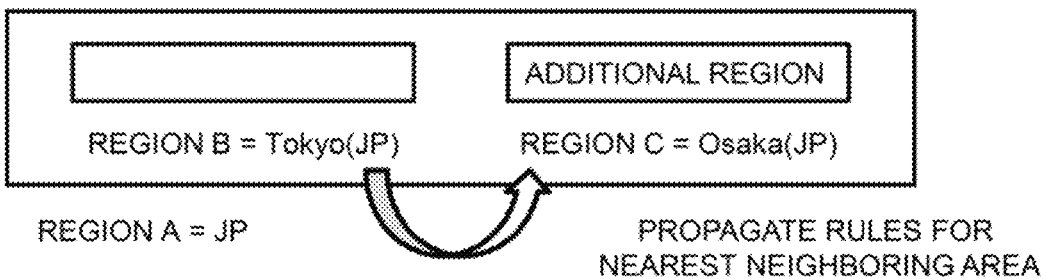

STORAGE SYSTEM AND LOAD DISTRIBUTION METHOD FOR STORAGE SYSTEM

TECHNICAL FIELD

The present invention relates to a storage system and a load distribution method for the storage system.

BACKGROUND ART

For example, PTL 1 discloses that "a load distribution apparatus includes: a utilization-rate means that acquires a resource utilization rate in a first cloud and a resource utilization rate of virtual machines operating in the first cloud; and a virtual-machine management means that, when the resource utilization rate of the virtual machines exceeds a predetermined first threshold value, activates new virtual machines in a second cloud if the resource utilization rate of the first cloud exceeds a second predetermined threshold value, and activates new virtual machines in the first cloud if the resource utilization rate in the second cloud is less than the second threshold value.

CITATION LIST

Patent Literature

PTL 1: Japanese Patent Application Laid-Open (Kokai) Publication No. 2015-153370

SUMMARY OF THE INVENTION

Problems to be Solved by the Invention

However, although the conventional technology described above carries out the migration of the virtual machines taking into account performance and cost, it does not do so taking into account the state of the virtual machines, compliance with the laws or rules of the migration destination(s), or the resource usage status of the migration destination(s), etc.

In other words, it is difficult to keep track of the ever-changing state of the application, including the virtual machines running on the controller, and to manually relocate the application while complying with the laws and the rules of a scale-out destination of the controller. In addition, the collection of the resource usage status at the scale-out destination is unrealistic from a security point of view when the scale-out destination is managed by another organization.

In light of the above, it is one object of the present invention to perform scale-out of a controller and migration of an application, taking into account the state of the application, the laws and the rules of the scale-out destination, and the resource usage status.

Means to Solve the Problems

In order to solve the above-described problems, provided according to an aspect of the present invention is a storage system configured by including a plurality of computer systems coupled together via a network, wherein each of the computer systems includes an administrative server and a controller that controls execution of execution targets including at least either one of an application, a virtual machine, and a container, and collects an operation status of resources to be used to execute the execution targets; and wherein the administrative server judges whether the operation status exceeds a threshold value or not; and if the administrative server detects that the operation status exceeds the threshold value, the administrative server: calculates a first index for each of the execution targets on the basis of information about at least either one of cost, credibility, and performance when the execution target which operates in one of the computer systems is migrated to another one of the computer systems and is caused to operate in the other computer system, and indexing information which indicates laws or rules applied to the computer system by using indexes; obtains, from the other computer system, a second index which uses a dimensionless quantity to indicate a degree of selection of the other computer system as a migration destination of the execution target; and decides the computer system which is the migration destination of the execution target from among the plurality of computer systems other than the one computer system on the basis of either one or both of the first index and the second index.

Advantageous Effects of the Invention

According to the present invention, for example, the scale-out of the controller and the migration of the application can be performed easily and appropriately while taking into account the state of the application, the laws and the rules of the scale-out destination, and the resource usage status.

BRIEF DESCRIPTION OF THE DRAWINGS

FIG. 4 is a diagram illustrating an example of the configuration of an APP score setting screen;

FIG. 5A is a diagram illustrating an example of the configuration of a scaling permission table;

FIG. 5B is a diagram illustrating an example of the configuration of an APP score setting table;

FIG. 5C is a diagram illustrating an example of the configuration of a region score storage table;

FIG. 5D is a diagram illustrating an example of the configuration of an applicability judgment table;

FIG. 5E is a diagram illustrating an example of the configuration of a region-based group table;

FIG. 5F is a diagram illustrating an example of the configuration of a country-based group classification table;

FIG. 13 is a diagram illustrating an example of the configuration of a resource usage status history table according to Variation 2;

FIG. 15 is an explanatory diagram for explaining the region group addition setting processing (country-based and area-based) according to the embodiment;

DESCRIPTION OF THE EMBODIMENTS

Figure 1:
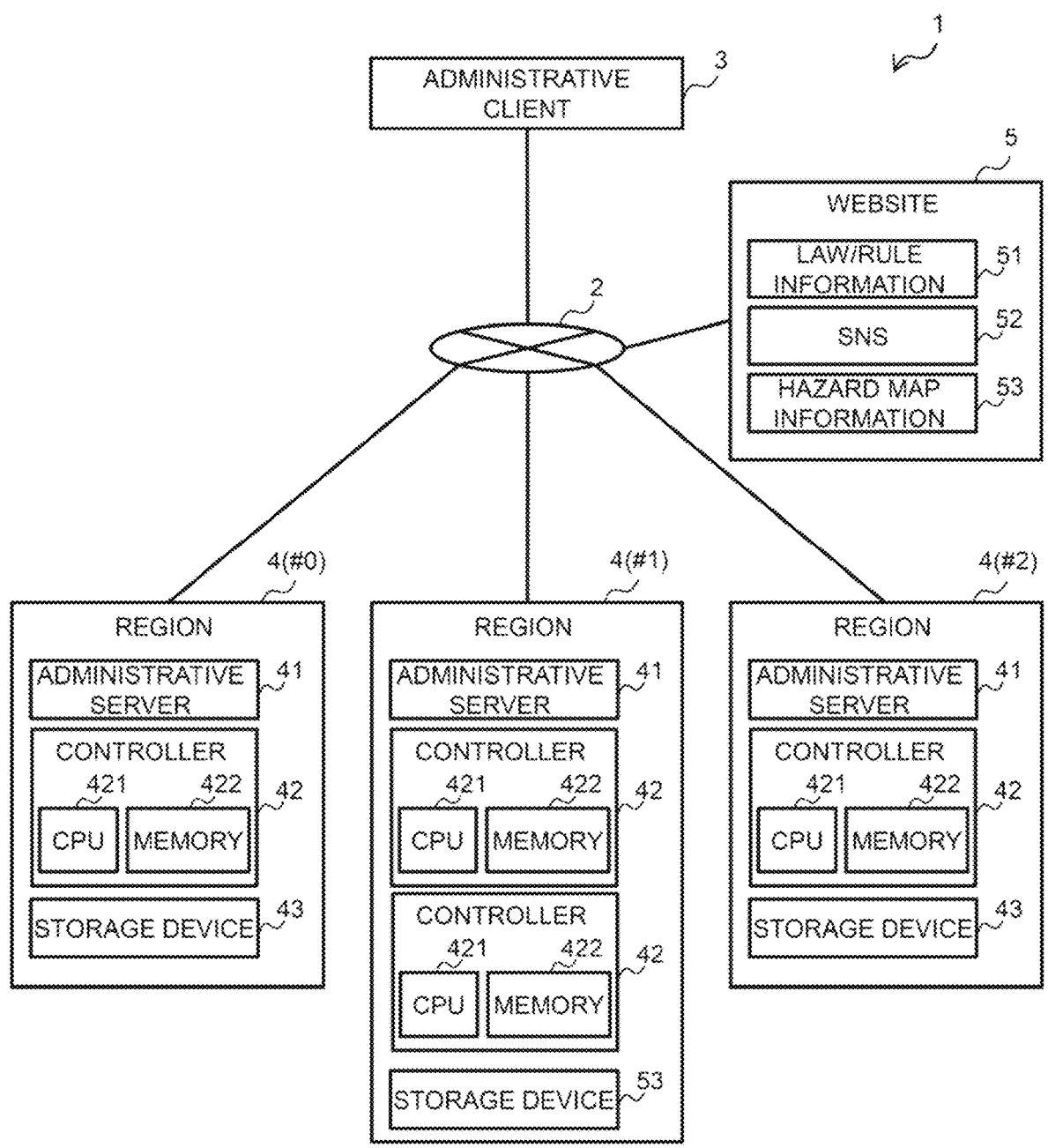
FIG. 1 is a diagram illustrating an example of the configuration of a storage system according to an embodiment.

An embodiment of the present invention will be explained below with reference to the drawings. The embodiment is an example to explain the present invention, and omissions and simplifications have been made as appropriate in order to clarify the explanation. The present invention can be implemented in various other forms, or in a combination of part(s) or all of the other forms. Unless otherwise specified, each constituent element may be either singular or plural.

When there are a plurality of constituent elements with the same or similar functions, the same reference numeral with different additional characters may be sometimes used for the explanation. In cases where there is no need to distinguish between such a plurality of constituent elements, the additional characters may be omitted in the relevant explanation.

(Configuration of Storage System 1)

FIG. 1 is a diagram illustrating an example of the configuration of a storage system 1 according to an embodiment. The storage system 1 is configured by including an administrative client 3 and one or more regions 4 that are coupled to so as to enable communication with each other via a network 2. FIG. 1 illustrates an example with three regions 4 (#0), 4 (#1), and 4 (#2), but the embodiment is not limited to this example. The region 4 can access a website 5 via the network 2.

Figure 2:
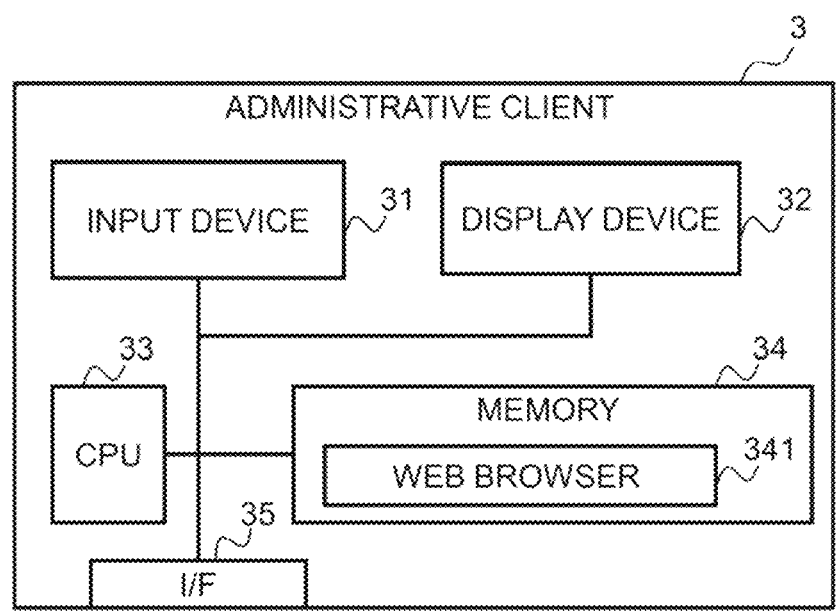
FIG. 2 is a diagram illustrating an example of the configuration of an administrative client.

The administrative client 3 accepts user input for APP (application) score setting that will be described later. As illustrated in FIG. 2, the administrative client 3 includes an input device 31, a display device 32, a CPU (Central Processing Unit) 33, a memory 34, and an I/F (Inter/Face) 35. The memory 34 stores processes of a web browser 341 that are executed by the CPU 33.

The administrative client 3 displays an input screen for the APP score setting on the display device 32 via the web browser 341 and accepts user input via the input device 31. The I/F 35 is a communication interface that allows the administrative client 3 to connect to the network 2. FIG. 2 illustrates an example of the administrative client 3 that uses the web browser 341 to display the input screen for the APP score setting, but other input/output functions may also be used.

The region 4 includes an administrative server 41 that runs management software that performs management control of the storage system 1 and the region 4, one or more controllers 42, and a storage device 43. The region 4 refers to a location where the administrative server 41, the controller 42, and an execution target which operates on the controller 42 exist, and is, for example, a computer system located at different geographical points. The execution target includes at least one of the following: the application, a VM (Virtual Machine), and a container. The execution target will be hereinafter referred to as the "APP" (Application).

The controller 42 has resources such as a CPU 421 and a memory 422, collects performance information of the resources and controls execution of the APP. However, it is not necessarily the case that the APP is operating in the region 4.

The storage device 43 includes one or more of drives that provide a storage area used by the administrative server 41 and the controller 42. The storage device 43 and the drive(s) do not necessarily have to be in the region 4, so long as they are able to communicate with the administrative server 41 and the controller 42 via the network.

The website 5 is one or more of servers on the Internet or an intranet that provide law/rule information 51, a social networking service (SNS) 52, and hazard map information 53, and so on. The law/rule information 51 includes the laws of a country or municipality, and the rules of a company or other organization, and so on. The SNS 52 includes information disseminated by the SNS. The hazard map information 53 is map information including a natural disaster damage range forecast provided by a nation, municipality, or other organization. The website 5 can use not only these kinds of information, but also various other information which can be used to evaluate each of the regions 4.

In the present embodiment, when an operation status of a resource (the CPU 421 or the memory 422, etc.) in a certain region 4 is put under strain, the administrative server 41 will temporarily scale out the resource and determine a region in a migration destination to which the APP will be migrated. When determining the region in the migration destination for the APP, a score (hereafter referred to as the "evaluation score") reflecting the migration destination's compliance with laws and rules, the ever-changing situation of the APP, and the operating cost, risk, and performance of the migration destination, and so on, is calculated in order to take such information into consideration. The information that forms the basis for the evaluation score calculation is acquired from user input and the website 5.

(Configuration of Region 4)

Figure 3:
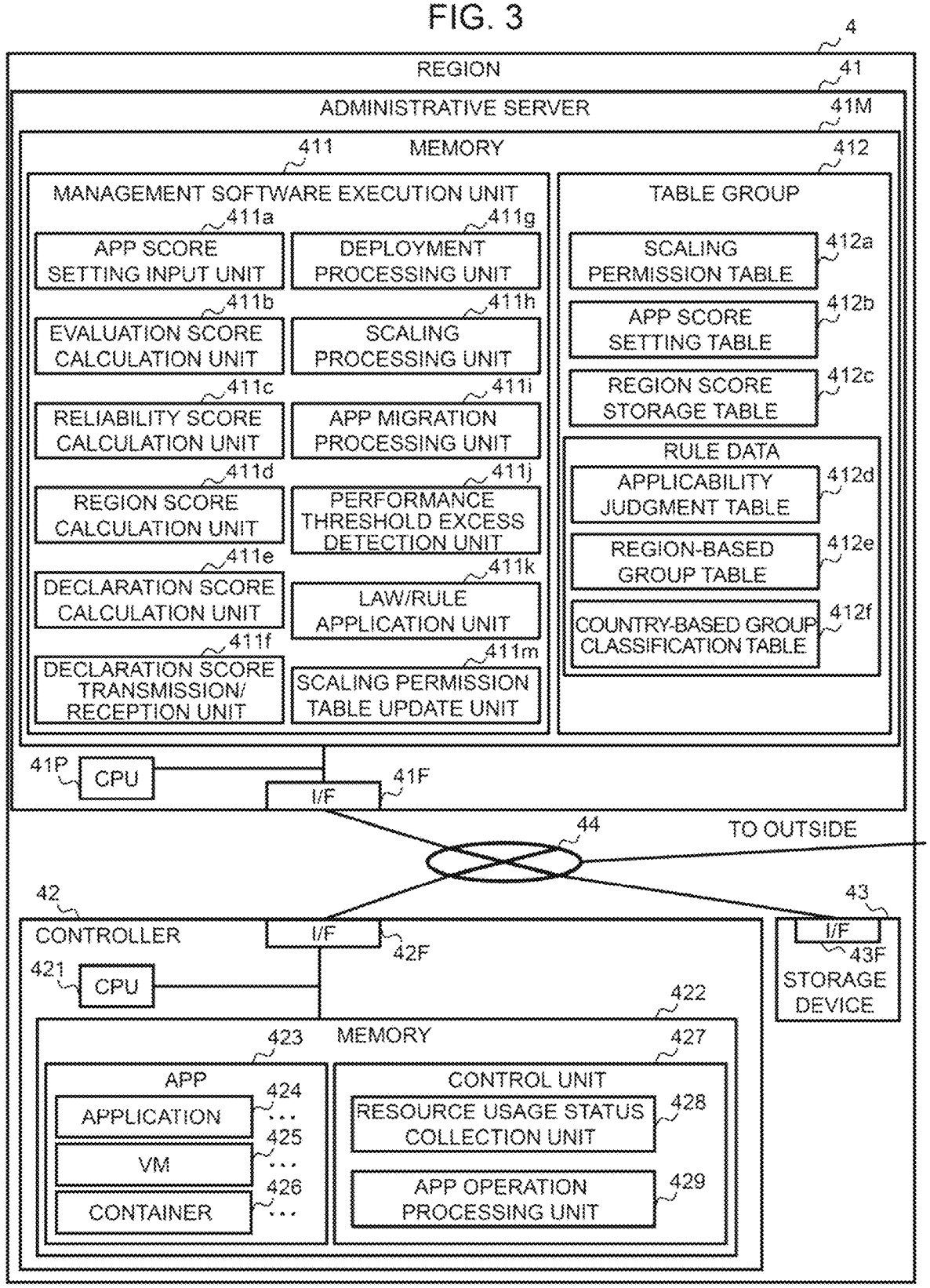
FIG. 3 is a diagram illustrating an example of the configuration of a region according to the embodiment.

FIG. 3 is a diagram illustrating an example of the configuration of the region 4 according to the embodiment. The region 4 includes the administrative server 41, one or more of the controllers 42, and the storage device 43 which are coupled together via the network 44. The storage device 43 does not necessarily have to be in the region 4, and may exist externally. Furthermore, the administrative server 41, the controller 42, an application 424, a VM 425, and a container 426 can communicate with the outside via the network 44.

The controller 42 includes the CPU 421, the memory 422, and the I/F 42, and is coupled to the network 44 via the I/F 42. The controller 42 stores, in the memory 422, the control unit 427, which is realized by program execution through cooperation by the CPU 421 and the memory 422, and the APP 424.

The control unit 427 includes a resource usage status collection unit 428 and an APP operation processing unit 429. The resource usage status collection unit 428 collects the usage status of resources such as the CPU and the memory 422 of the controller 42. The resource usage status is acquired by a declaration score calculation unit 411e of a management software execution unit 411 during calculation of a declaration score $S_{declare}^{R}$.

The APP 423 includes at least either one of the application 424, the VM 425, and the container 426 operating under control of the APP operation processing unit 429. However, the VM 425 and the container 426 do not operate at the same time, and only one of them operates. Furthermore, the application 424, the VM 425, and the container 426 do not necessarily have to be operating.

The storage device 43 is configured by including one or more drives and an I/F 43F, and is coupled to the network 44 via the I/F 43F. The storage device 43 may exist outside of the region 4.

The administrative server 41 is configured by including a CPU 41P, a memory 41M, and an I/F 41F, and is coupled to the network 44 via the I/F 41F. The administrative server 41 stores, in the memory 41M, the management software execution unit 411, which is a function of the management software realized by program execution in cooperation with the CPU 41P, and a table group 412.

The management software execution unit 411 includes an APP score setting input unit 411a, an evaluation score calculation unit 411b, a reliability score calculation unit 411c, a region score calculation unit 411d, the declaration score calculation unit 411e, a declaration score transmission/reception unit 411f, a deployment processing unit 411g, a scaling processing unit 411h, an APP migration processing unit 411i, a performance threshold excess detection unit 411j, a law/rule application unit 411k, and a scaling permission table update unit 411m.

Furthermore, the table group 412 includes a scaling permission table 412a (FIG. 5A), an APP score setting table 412b (FIG. 5B), a region score storage table 412c (FIG. 5C), an applicability judgment table 412d (FIG. 5D), a region-based group table 412e (FIG. 5E), and a country-based group classification table 412f (FIG. 5F). The applicability judgment table 412d, the region-based group table 412e, and the country-based group classification table 412f are tables that turn the details of the laws and the rules into data.

The scaling permission table 412a has, as illustrated in FIG. 5A, columns for APP #, region #0, region #1, and so on, and stores, for each APP, a score for scalability to each of the regions based on compliance with the laws and the rules. The scaling permission table 412a stores a law score $L^{A,R}$ to correspond to APP #A (A=0, 1, . . . ) and the region #R (R=0, 1, . . . ). The law score $L^{A,R}$ is a dimensionless quantity that takes one of the values {0, 1}.

The APP score setting table 412b has, as illustrated in FIG. 5B, columns for APP #, cost: score #0: communication cost, risk: score #1: natural disaster, risk: score #2: inspection, performance: score #3: latency, performance: score #4: communication speed, and so on. The APP score setting table 412b stores an APP score $S_i^A$ to correspond to APP #A (A=0, 1, . . . ) and the score #i (i=0, 1, . . . ). The APP score $S_i^A$ is a dimensionless quantity normalized with the range [0, 1]. FIG. 5B illustrates merely one example of the column items of the APP score setting table 412b, which may also contain other items.

The region score storage table 412c has, as illustrated in FIG. 5C, columns for APP #, cost: score #0: communication cost, risk: score #1: natural disaster, risk: score #2: inspection, performance: score #3: latency, performance: score #4: communication speed, and so on. The region score storage table 412c stores a region score $S_i^R$ to correspond to the region #R (R=0, 1, . . . ) and the score #i (i=0, 1, . . . ). The region score $S_i^R$ is a dimensionless quantity normalized with the range [0, 1]. The column items in the region score storage table 412c are identical to the column items in the APP score setting table 412b. FIG. 5C illustrates merely one example of the column items of the region score storage table 412c, which may also contain other items.

The applicability judgment table 412d has, as illustrated in FIG. 5D, columns for APP #, parameter sheet registration, applicability judgment, and permission. The applicability judgment table 412d is a table that gives a score based on an applicability judgment for the relevant items in the scaling permission table 412a when a group in the country-based group classification table 412f is changed or any other applicability judgment is re-executed. The permission column in the applicability judgment table 412d can be omitted.

The region-based group table 412e has, as illustrated in FIG. 5E, columns for APP # and group #, and indicates the group to which each of the regions 4 belongs.

The country-based group classification table 412f has, as illustrated in FIG. 5F, columns for a country code and group #, and indicates the group that corresponds to the country code.

Incidentally, each of the aforementioned tables do not necessarily need to exist in the memory 41M, so long as they exist in a storage area that can be accessed by the management software execution unit 411.

FIG. 4 is a diagram illustrating an example of the configuration of an APP score setting screen 341D according to the embodiment. The APP score setting input unit 411a accepts the settings entered via the APP score setting screen 341D displayed in the web browser 341 of the administrative client 3 and stores the settings in the scaling permission table 412a and the APP score setting table 412b.

The user enters, via the APP score setting screen 341D, for each APP, whether migration to the region 4 is permitted upon the scale-out (the export control law judgment), and an important point for the region 4 of the scaling destination (the scaling destination important point). The export control law judgment must be complied with, but as it is not always the case that a region that can satisfy all the requirements with respect to the scaling destination important point exists, a best effort will be sufficient.

The APP score setting screen 341D has a pull-down menu 341a, a toggle switch 341b, and a slider bar 341c. Selection of a settings-target APP is entered via the pull-down menu 341a.

The availability as a scaling destination is input for each region of the settings-target APP via the toggle switch 341b. For each of the regions 4, if the relevant region is permitted as a scaling destination (Yes), "1" is stored in the APP # and the region # columns of the scaling permission table 412a, while "0" is stored if it is not permitted as the scaling destination (No). The scaling destination availability information in the scaling permission table 412a is, for example, the law score, which is "1" (scaling permitted) for countries that are not subject to the export control laws, and "0" (scaling not permitted) for countries that are subject to the export control laws. It should be noted that, with respect to the availability information, instead of using "1", "scaling permitted" may be expressed as a value (0, 1] that takes into account other circumstances concerning the scaling destination.

A level required by a user for each scaling destination important point of the settings-target APP is input via the slider bar 341c. Examples of the scaling destination important point include, but are not limited to, "cost," "risk," and "performance." Also, each scaling destination important point may undergo further detailed itemization by internal processing in the APP score setting input unit 411a. The levels for "cost," "risk," and "performance" required of the region 4 of the scaling destination are input via the slider bar 341c, converted into numerical values of [0, 1] by internal processing, and then stored in the relevant column of the APP score setting table 412b.

Incidentally, when a new region is added, initial values may be automatically set in the scaling permission table 412a and the APP score setting table 412b, or they may be set based on user input.

Explanations of the evaluation score calculation unit 411b, the reliability score calculation unit 411c, the region score calculation unit 411d, the declaration score calculation unit 411e, and the declaration score transmission/reception unit will be provided later.

As will be described later, the deployment processing unit 411g determines the APP to be migrated and the region 4 of the migration destination based on the evaluation score $S^{A,R}$ calculated by the evaluation score calculation unit 411b. For example, the deployment processing unit 411g decides to migrate the APP #A to the region #R with the largest evaluation score $S^{A,R}$. Then, the deployment processing unit 411g issues an instruction for scale-out, which secures resources for the controller 42 in the region 4 of the migration destination of the APP, to the scaling processing unit 411h. Furthermore, the deployment processing unit 411g issues an instruction to the APP migration processing unit 411i for migration of the APP to the controller 42 in the region 4 of the scaled-out migration destination.

Furthermore, the deployment processing unit 411g issues an instruction to the APP migration processing unit 411i for return of the APP from the controller 42 in the region 4 of the migration destination. Furthermore, the deployment processing unit 411g issues an instruction for scale-in, which releases resources of the controller 42 scaled-out in the region 4 of the migration destination of the APP, to the scaling processing unit 411h.

The scaling processing unit 411h scales out the controller 42 of a migration source, together with the deployment processing unit 411g of the region 4 of the migration destination as indicated in the instruction issued by the deployment processing unit 411g, to the region 4 of the migration destination. Furthermore, the scaling processing unit 411h scales in the controller 42 of the migration destination of the APP, together with the deployment processing unit 411g of the region 4 of the migration destination as indicated in the instruction issued by the deployment processing unit 411g.

The APP migration processing unit 411i migrates the APP of the migration source to the controller 42 of the migration destination, together with the APP migration processing unit 411i of the region 4 of the migration destination as indicated in the instruction issued by the deployment processing unit 411g. Furthermore, the APP migration processing unit 411i returns the migrated APP to the controller 42 of the migration source, together with the APP migration processing unit 411i of the region 4 of the migration destination as indicated in the instruction issued by the deployment processing unit 411g.

The performance threshold excess detection unit 411j monitors the load status, such as a usage rate of resources (the CPU 421, the memory 422, etc.) of the controller 42, and detects when the load exceeds a performance threshold value. It should be noted that the resources are not limited to the CPU 421 and the memory 422 of the controller 42, and may also include the network resources, the storage device 43, and any other resources necessary to execute the APP.

The law/rule application unit 411k executes region group addition setting processing (FIG. 14, FIG. 15, FIG. 16, FIG. 17) that will be described later.

The scaling permission table update unit 411m executes scaling permission table automatic update processing that will be described later. In the scaling permission table automatic update processing, the scaling permission table 412a is automatically updated based on the applicability judgment table 412d and the region-based group table 412e when a change to the country-based group classification table 412f is detected. The scaling permission table automatic update processing will be described later with reference to FIG. 18, FIG. 19, FIG. 20, and FIG. 21.

(Example of Calculation of Evaluation Score $S^{A,R}$)

Figure 6:
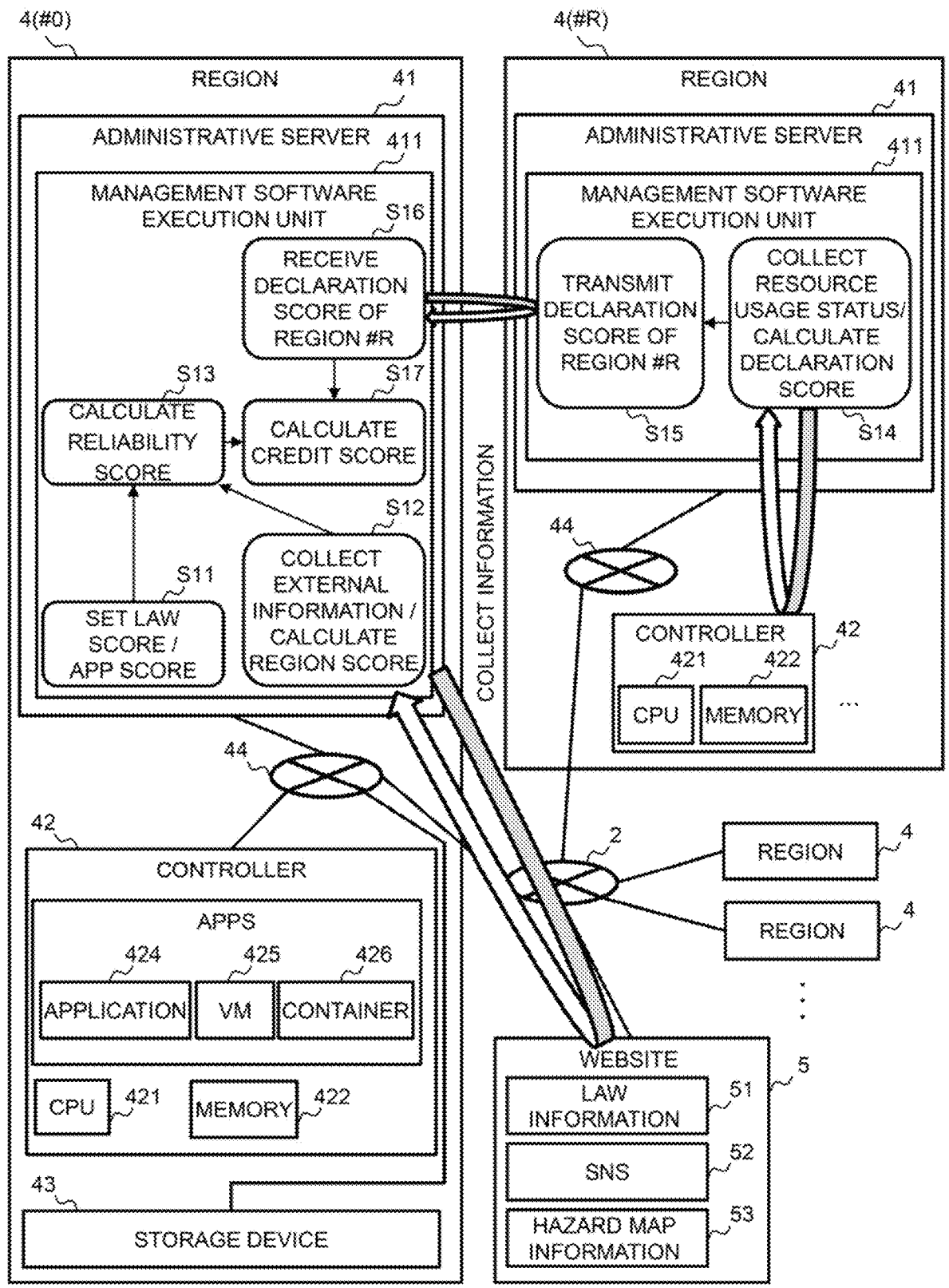
FIG. 6 is an explanatory diagram for explaining a calculation example of an evaluation score.

FIG. 6 is an explanatory diagram for explaining a calculation example of the evaluation score $S^{A,R}$. The evaluation score is an index used, when migrating the APP from one region 4 to another region 4, to evaluate the ease of migration to such other region 4. FIG. 6 illustrates an example in which the region #0 calculates the evaluation score $S^{A,R}$ which evaluates the region #R with respect to the migration of the APP #A. The evaluation score $S^{A,R}$ upon the migration of the APP #A to the region #R is calculated as the product of the reliability score $S_{reliability}^{A,R}$ and the declaration score $S_{declare}^{R}$, based on the following Expression (1).

[Math. 1]

$$S^{A,R} = S_{reliability}^{A,R} \times S_{declare}^{R} = \left(\sum_{i=0}^{k} f_i(s_i^R, s_i^A) \times L^{A,R}\right) \times S_{declare}^{R} \quad (1)$$

$$f_i(s_i^R, s_i^A) = a^{min(s_i^R, s_i^A) - s_i^A} \quad (a > 1)$$

$s_i^R$: i-th region score of region #R based on external information $\in [0, 1]$ $s_i^A$: i-th APP score which is set to APP#A $\in [0, 1]$ $L^{A,R}$: law score when migrating APP#A to region #R $\in \{0, 1\}$ $S_{declare}^{R}$: declaration score of region #R $\in [0, 1]$ The reliability score $S_{reliability}^{A,R}$ represents the sum of the functions fi($S_i^R$, $S_i^A$) that take the values of (0, 1] based on a number k of the APP scores $S_i^A$ and the region scores $S_i^R$ corresponding to APP #A in the APP score setting table 412b and the region score storage table 412c. The reliability score $S_{reliability}^{A,R}$ is a positive number that increases in value the greater the compliance with the laws as a scaling destination and the greater the number of score items that satisfy the level required of the scaling destination important points the region 4 has. The reliability score $S_{rehability}^{A,R}$ for the region 4, which does not comply with the laws as the scaling destination, is "0."

The APP score $S_i^A$ is the score #i of the APP #A in the APP score setting table 412b. The region score $S_i^R$ is the score #i of the the region #R in the region score storage table 412c.

The law score $L^{A,R}$ is the score corresponding to the APP #A and the region #R in the scaling permission table 412a.

In step S11, the APP score setting input unit 411a in the region #0 accepts the APP score setting input from the APP score setting screen 341D and stores the law score $L^{A,R}$ in the scaling permission table 412a and the APP score $S_i^A$ in the APP score setting table 412b.

In step S12, the region score calculation unit 411d of the region #0 collects external information from the website 5, etc., calculates the region score $S_i^R$ based on the collected external information, and stores it in the region score storage table 412c. The region score $S_i^R$, which is stored in the region score storage table 412c, is updated periodically. It should be noted that the region score storage table 412c may be omitted. The region score calculation unit 411d may calculate the region score $S_i^R$ in real time by collecting the external information when necessary.

The region score $S_i^R$, is an index that evaluates the region #R from the outside by analyzing the law information, static information such as a hazard map, dynamic information such as an SNS, and a price list, etc. and calculating a risk value in real time. For example, in the case of a "natural disaster," an area with high risk can be calculated dynamically by using the hazard maps for floods and earthquakes and SNS analysis. Furthermore, risks concerning credibility, such as "malfunction," or "inspection (communication interception)," etc., can be calculated from negative and positive scores for text information by using, for example, machine learning. In addition, performance such as "latency" and "communication speed" can use measured values of the communication between the regions.

Furthermore, since the unit differs depending on the item, the region score $S_i^R$ is normalized to a dimensionless quantity of [0, 1] based on a maximum value Max and a minimum value Min for each acquired value x according to the following Expression (2).

[Math. 2]
$$S_i^R = 1 - \frac{x - \text{Min}}{\text{Max} - \text{Min}} \quad (2)$$

In step S13, the reliability score calculation unit 411c of the region #0 acquires the law score $L^{A,R}$, the APP score $S_i^A$, and the region score $S_i^R$ respectively from the scaling permission table 412a, the APP score setting table 412b, and the region score storage table 412c. The reliability score $S_{reliability}^{A,R}$ is then calculated based on Expression (1).

In step S14, the declaration score calculation unit 411e of the the region #R calculates the declaration score $S_{declare}^R$ of the region #1 based on the resource usage status of the controller 42, etc., of the region #R. The declaration score calculation unit 411e calculates the declaration score $S_{declare}^R$ from the resource performance values and maintenance times of the controller 42, etc., under the control of the administrative server 41 in the region #R.

The declaration score calculation unit 411e calculates the declaration score $S_{declare}^R$, for example, based on Expression (3). In Expression (3), the average values (momentary values or migration average values) for the utilization rate of the resources under the control of the administrative server 41 in the region #R, for example, the CPU 421 and the memory 422, have respectively been set to $S_{cpu}$ and $S_{mem}$ (0 to 1 (0% to 100%)). In addition, the time of entry of a maintenance date has been set as $M_{input}$, the maintenance date as $M_{exec}$, and the current time as $M_{now}$ (0 to 1).

[Math. 3]
$$S_{declare}^R = (1 - \text{Max}(S_{cpu}, S_{mem})) \times M_{now} \quad (3)$$

Figure 7:
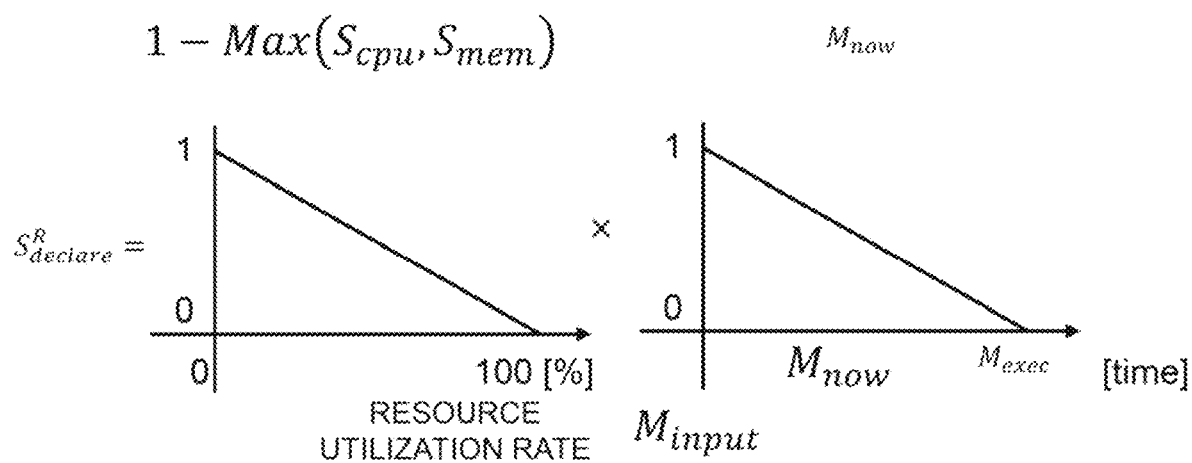
FIG. 7 is an explanatory diagram for explaining a calculation example of a declaration score.

The calculation of the declaration score $S_{declare}^R$ is explained below with reference to FIG. 7. FIG. 7 is a schematic diagram to explain a calculation example of the declaration score $S_{declare}^R$ according to the embodiment. As illustrated in FIG. 7, a first factor on the right-hand side of Expression (3) takes a value [0, 1] and becomes smaller the closer the larger of the average values of the utilization rates of the CPU 421 and the memory 422 gets to 100%. Furthermore, a second factor on the right-hand side of Expression (3) takes a value [0, 1], and becomes smaller the closer the current time $M_{now}$ gets to the maintenance date $M_{exec}$.

In other words, the declaration score $S_{declare}^R$ is a dimensionless quantity in the range [0, 1], which becomes smaller the higher the resource utilization rate is and the closer the maintenance date is. Therefore, the declaration score $S_{declare}^R$ is a score that reflects information such as the resource status of the relevant region 4, but keeps the details secret from the outside. Based on Expression (1), by multiplying the declaration score $S_{declare}^R$ acquired from the other region 4 by the reliability score $S_{reliability}^{A,R}$, the value of the evaluation score $S^{A,R}$ can be kept under control, enabling adjustment of the ease of migration of the APP #A to the region #R. Furthermore, by having each of the administrative servers 41 calculate the declaration score $S_{declare}^R$ and notify the other administrative servers 41 in the region 4, the declaration score $S_{declare}^R$ is exchanged mutually, thereby making it possible to reduce the burden of calculating the declaration score $S_{declare}^R$.

In step S15, the declaration score transmission/reception unit 411f of the region #R sends the declaration score $S_{declare}^R$ calculated in step 14 to the region #R in response to a request from the management software execution unit 411 of the region #0.

In step S16, the declaration score transmission/reception unit 411f of the region #0, in response to an inquiry from the administrative server 41, receives the declaration score $S_{declare}^R$ sent by the declaration score transmission/reception unit 411f of the region #R.

In step S17, the evaluation score calculation unit 411b calculates, based on Expression (1), the evaluation score $S^{A,R}$ for each APP by multiplying the reliability score $S_{reliability}^{A,R}$ calculated in step S13 by the declaration score $S_{declare}^R$ of the region #R received in step S16.

It should be noted that by always having the declaration score $S_{declare}^R = 1$, the selection of the region 4 of the scale-out destination can be based only on the reliability score $S_{reliability}^{A,R}$. In this case, even in a situation where the declaration score $S_{declare}^R$ cannot be acquired from another region 4, the region 4 that complies with the laws and also is in conformance with respect to the scaling destination important points can be selected as the scaling destination.

Furthermore, by always having the reliability score $S_{reliability}^{A,R} = 1$, the selection of the region 4 of the scale-out destination can be based only on the declaration score $S_{declare}^R$. For example, when selecting a region within the same country but operated by a different company as the scale-out destination, it is clear that there is no issue under the export control laws, and therefore the scaling destination can be selected appropriately without the need for detailed internal information concerning the scaling destination even if the information concerning the reliability score $S_{reliability}^{A,R}$ is omitted.

(Scale-Out Processing)

Figure 8:
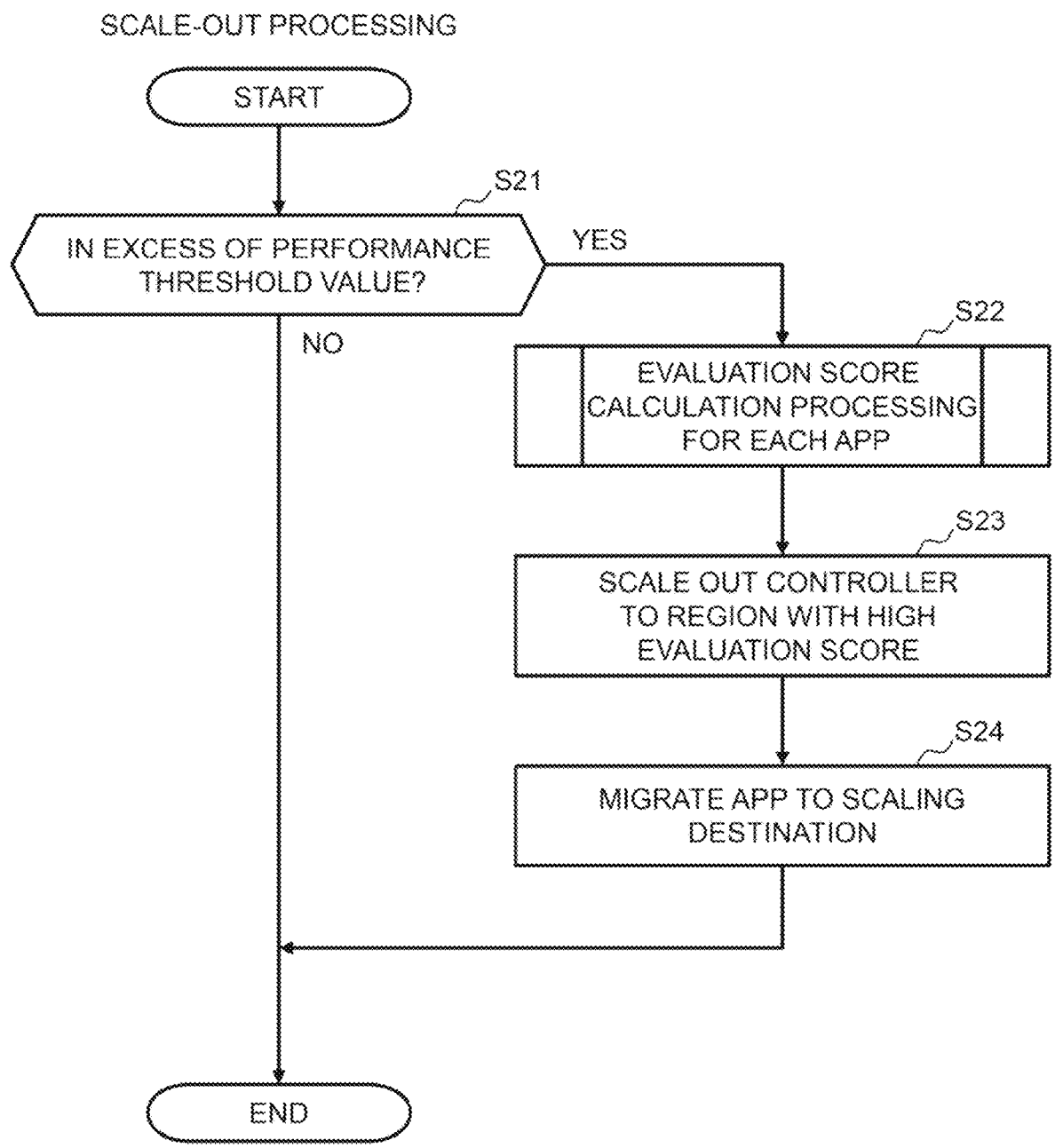
FIG. 8 is a flowchart illustrating an example of scale-out processing according to the embodiment.
Figure 9:
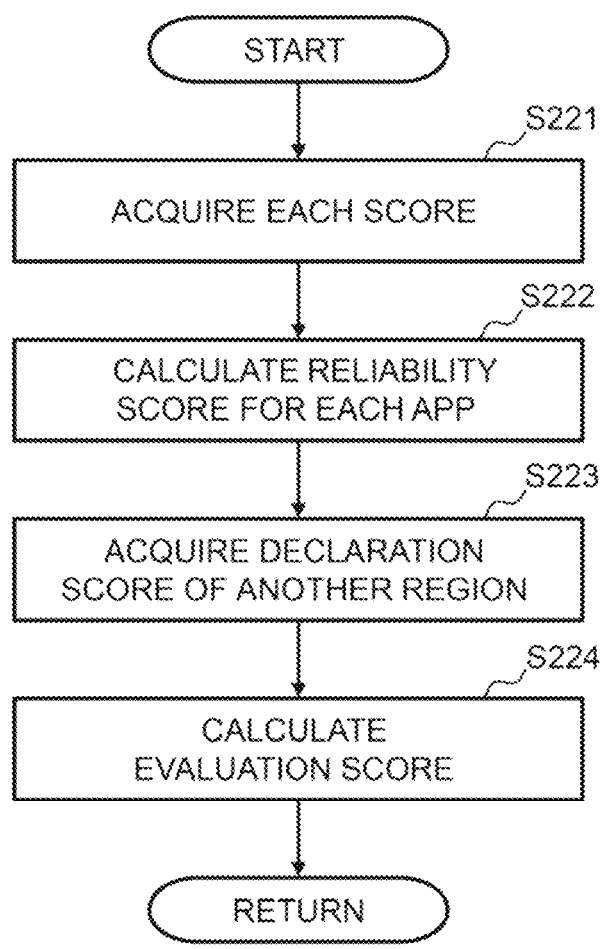
FIG. 9 is a flowchart illustrating an example of evaluation score calculation processing for each APP.

FIG. 8 is a flowchart illustrating an example of scale-out processing according to the embodiment. Furthermore, FIG. 9 is a flowchart illustrating an example of the evaluation score calculation processing for each APP in step S22 of FIG. 8. This scale-out processing is executed as triggered by a change in the performance threshold value or a change in the laws or the rules, or on predetermined cycle. The scale-out processing is also evoked by the regular APP redeployment processing (FIG. 10), which will be described later.

In step S21, the performance threshold excess detection unit 411$j$ judges whether or not the operation status, which is the utilization rate for resources such as the controller 42, etc., has exceeded the performance threshold value. If the performance threshold value has been exceeded (step S21: YES), the performance threshold excess detection unit 411$j$ proceeds to the processing in step S22; and if the performance threshold value has not been exceeded (step S21: NO), this scale-out processing is terminated.

In step S22, the evaluation score calculation unit 411$b$ executes the evaluation score calculation processing for each APP, which will be described later with reference to FIG. 9. In the processing in step S22, a plurality of evaluation scores $S^{A,R}$ is calculated for each APP and each region.

In step S23, the deployment processing unit 411$g$ issues an instruction to the scaling processing unit 411$h$ to scale out the controller 42 to the region 4 with, for example, the largest of the evaluation scores $S^{A,R}$ calculated in step S22. In step S24, the deployment processing unit 411$g$ issues an instruction to the APP migration processing unit 411$i$ to migrate the relevant APP to the region 4 that was scaled out in step S23.

The details of the evaluation score calculation processing for each APP in step S22 of FIG. 8 will be explained below with reference to FIG. 9. In step S221, the reliability score calculation unit 411$c$ acquires the law score $L^{A,R}$, the APP score $S_i^A$, and the region score $S_i^R$ respectively from the scaling permission table 412$a$, the APP score setting table 412$b$, and the region score storage table 412$c$.

Next, in step S222, the reliability score calculation unit 411$c$ calculates the reliability score $S_{reliability}^{A,R}$ for each APP based on Expression (1). Then, in step S223, the declaration score transmission/reception unit 411$f$ acquires the declaration score $S_{declare}^{R}$ of another region 4.

Next, in step S224, the evaluation score calculation unit 411$b$ calculates the evaluation score SA, R based on Expression (1).

(Regular APP Redeployment Processing)

The present embodiment has an objective of a temporary scale-out in compliance with the laws. Therefore, taking into account the load on the scaling destination, scaling-in or redeployment takes place as triggered by a change in the performance threshold value of the scaling source or the scaling destination, a change in the laws or the rules, or on a predetermined cycle. However, in order to suppress high-load scale-outs and re-execution of APP migration, scaling-in or redeployment may take place when it is highly probable that the situation of the resources of the scaling source being under strain has been resolved, with the evaluation score $S^{A,R}$ having decreased more than a certain level from the initial scale-out time, or a predetermined cycle of certain length being complete, as a trigger.

Figure 10:
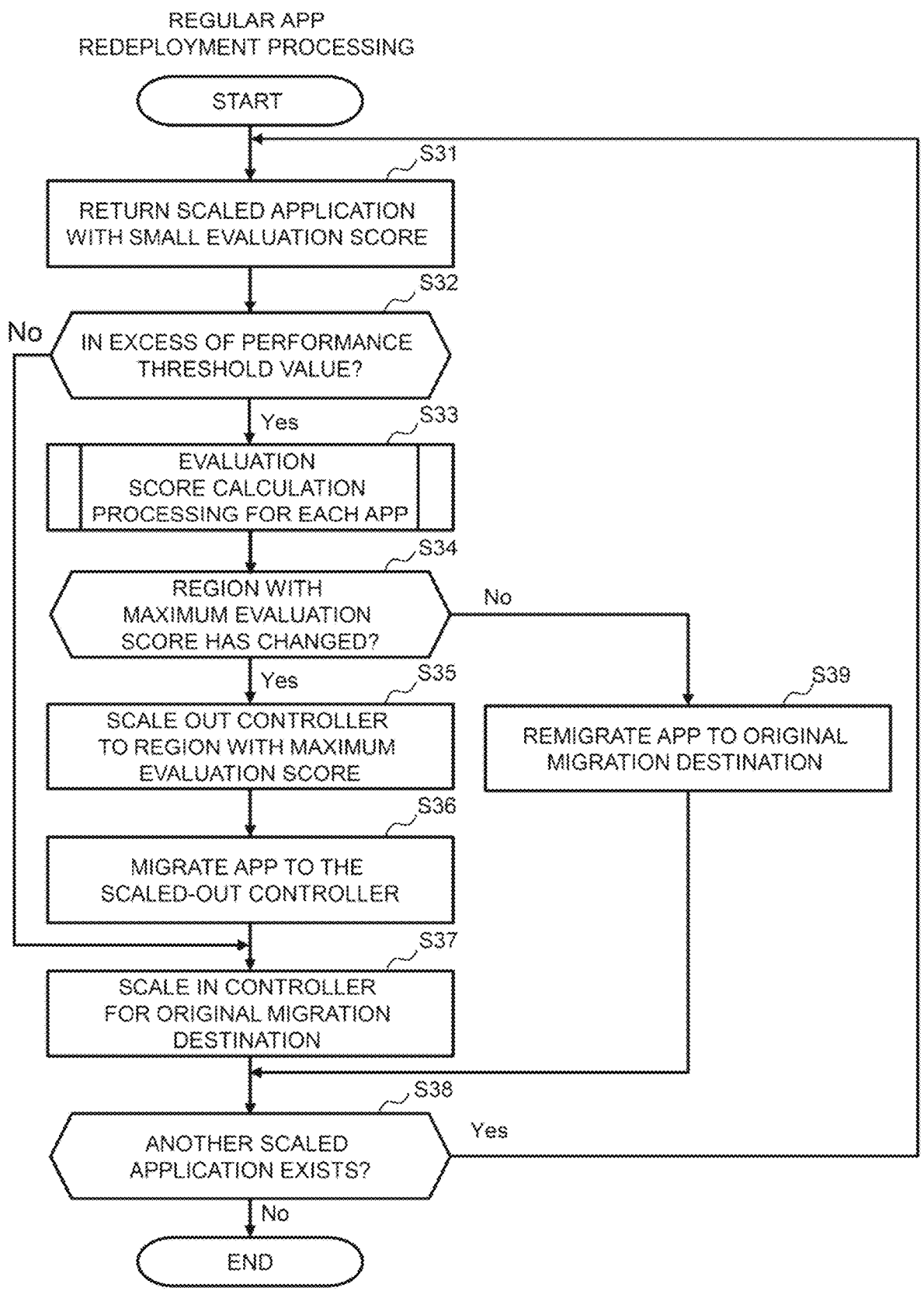
FIG. 10 is a flowchart illustrating an example of regular APP redeployment processing according to the embodiment.

FIG. 10 is a flowchart illustrating an example of the regular APP redeployment processing according to the embodiment. In step S31, the deployment processing unit 411$g$ issues an instruction to the APP migration processing unit 411$i$ to return, from among the scaled applications scaled-out to the other region 4, the scaled application with, for example, the smallest of the evaluation scores $S^{A,R}$ to its own region 4, which is the migration source.

Next, in step S32 the performance threshold excess detection unit 411$j$ judges whether or not the operation status, such as the resource utilization rate of the controller 42, has exceeded the performance threshold value as a result of the scaled application having been returned to its own region 4. If the performance threshold value has been exceeded (step S32: YES), the performance threshold excess detection unit 411$j$ proceeds to the processing in step S33; and if the performance threshold value has not been exceeded (step S32: NO), the performance threshold excess detection unit 411$j$ proceeds to the processing in step S37.

In step S33, the evaluation score calculation unit 411$b$ executes the evaluation score calculation processing for each APP in FIG. 9. Next, in step S34, the deployment processing unit 411$g$ judges whether the region with the largest evaluation score SA,R calculated in step S33 has changed from the region of the scaling destination of the scaled application that was returned to the migration source in step S31. If the region with the largest evaluation score $S^{A,R}$ has changed (step S34: YES), the deployment processing unit 411$g$ proceeds to the processing in step S35; and if the region has not changed (step S34: NO), the deployment processing unit 411$g$ proceeds to the processing in step S39.

In step S35, the deployment processing unit 411$g$ issues an instruction to the scaling processing unit 411$h$ to scale out the controller 42 to the region 4 with the largest evaluation score $S^{A,R}$ calculated in step S33. Next, in step S36, the deployment processing unit 411$g$ issues an instruction to the APP migration processing unit 411$i$ to migrate the relevant APP to the scaling destination in step S35. Next, in step S37, the deployment processing unit 411$g$ issues an instruction to the scaling processing unit 411$h$ to scale in the controller of the region 4 of the original migration destination where the scaled application was operating before the processing in step S31. Steps S35 to S37 are the redeployment of the scaling destination of the APP.

Next, in step S38, the deployment processing unit 411$g$ judges whether or not any other scaled application exists, and returns to step S31 if one does exist (step S38: YES), or terminates the regular APP redeployment processing if it does not exist (step S38: NO). In step S31, which is the processing executed following step S38, the target of the processing becomes, other than the evaluation score $S^{A,R}$ that was selected previously, for example, the scaled application with the smallest evaluation score $S^{A,R}$.

Meanwhile, in step S39, the deployment processing unit 411$g$ migrates the scaled application that was returned in step S31 back to the original scaling destination again. Step S39 is for a case where there is no change in the scaling destination of the APP.

(Variation 1 of Regular APP Redeployment Processing)

Figure 11:
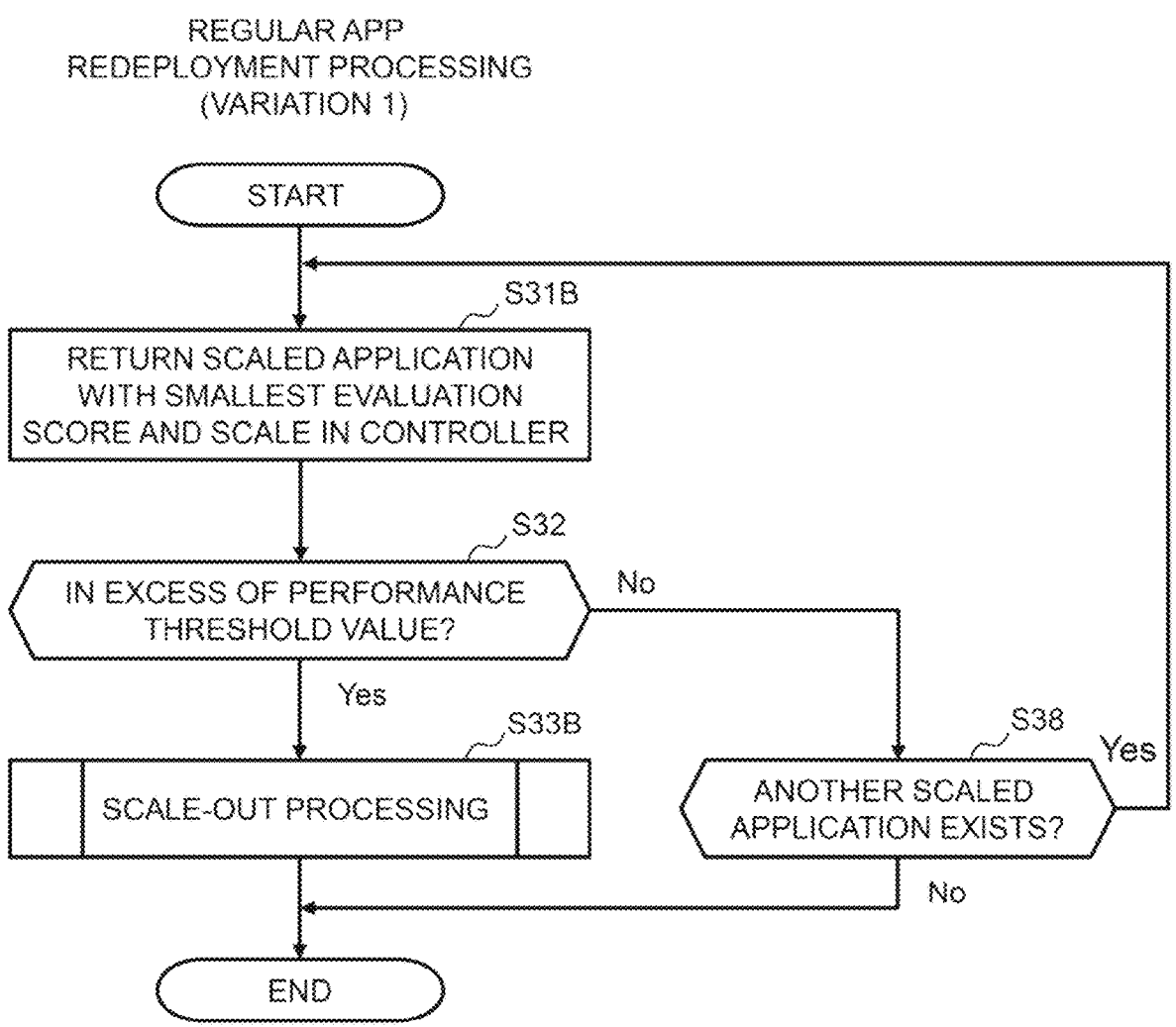
FIG. 11 is a flowchart illustrating an example of the regular APP redeployment processing according to Variation 1.

The regular APP redeployment processing, which was described in FIG. 9, executes the migration of the APP and the scaling of the controller separately, thereby eliminating redundancy in which the same region 4 is scaled-out again after the scaling-in of the APP. Another example of the regular APP redeployment processing is considered in Variation 1, which determines the scaling destination again if the performance threshold value of the controller 42 where the APP has been returned is exceeded after the scaling-in of the APP. The details of Variation 1 of the regular APP redeployment processing will be explained below with reference to FIG. 11. In the explanation of FIG. 11, processes that are the same as those in FIG. 10 have been given the same reference numerals and have had their explanations omitted.

FIG. 11 is a flowchart illustrating an example of the regular APP redeployment processing according to Variation 1. In step S31B, the deployment processing unit 411g issues an instruction to the APP migration processing unit 411i to return, from among the scaled applications scaled out to the other region 4, the scaled application with, for example, the smallest of the evaluation scores $S^{A,R}$ to its own region 4. Then, the deployment processing unit 411g issues an instruction to the scaling processing unit 411h to scale in the controller of the relevant scaling destination.

Next, the performance threshold excess detection unit 411j performs the processing in step S32, and if the performance threshold value has been exceeded (step S32: YES), the performance threshold excess detection unit 411j proceeds to the processing in step S33B, and if the performance threshold value has not been exceeded (step S32: NO), the performance threshold excess detection unit 411j proceeds to the processing in step S38.

In step S33B, the deployment processing unit 411g executes the scale-out processing illustrated in FIG. 8. The deployment processing unit 411g terminates this regular APP redeployment processing after the completion of step S33B.

Meanwhile, in step S38 the deployment processing unit 411g judges whether or not any other scaled application exists, and returns to step S31B if one does exist (step S38: YES), or terminates the regular APP redeployment processing if it does not exist (step S38: NO). In step S38 which is the processing executed following step S31 the target of the processing becomes, other than the evaluation score(s) $S^{A,R}$ that was selected previously, the scaled application with the smallest evaluation score $S^{A,R}$.

Figure 12:
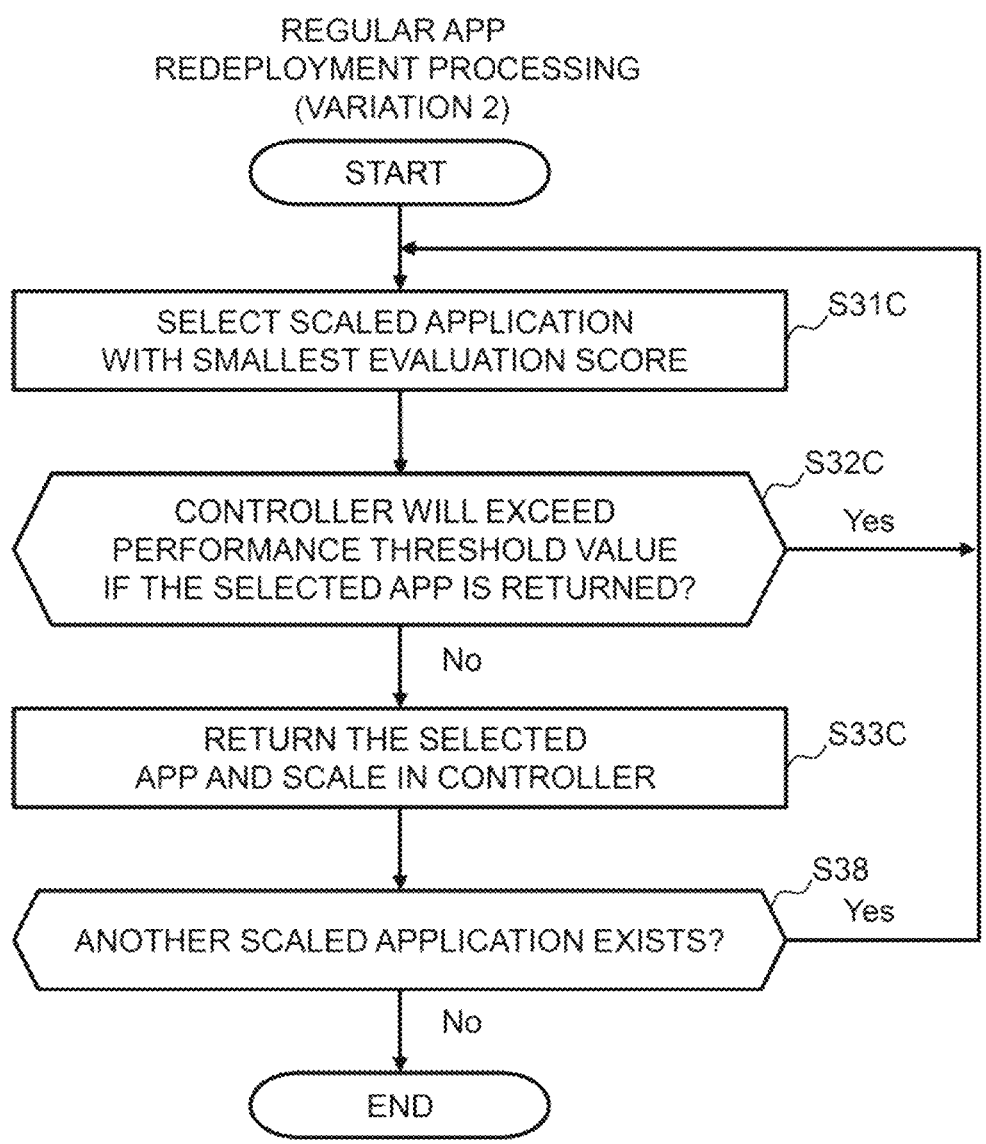
FIG. 12 is a flowchart illustrating an example of the regular APP redeployment processing according to Variation 2.

(Variation 2 of Regular APP Redeployment Processing) The regular APP redeployment processing of Variation 1 explained with reference to FIG. 11 simplifies processing by successively executing the migration of the APP and the scaling of the controller, but redundancy exists whereby the same region 4 is scaled out again after the scaling-in of the APP. Another possible example of the regular APP redeployment processing is considered in Variation 2, which only actually returns the APP and scales in the controller 42 if the performance threshold value of the controller 42 is not predicted to be exceeded in the event the APP is returned to the migration source. The details of Variation 2 of the regular APP redeployment processing will be explained below with reference to FIG. 12. In the explanation of FIG. 12, processes that are the same as those in FIG. 10 have been given the same reference numerals and have had their explanations omitted.

FIG. 12 is a flowchart illustrating an example of the regular APP redeployment processing according to Variation 2. In step S31C, the deployment processing unit 411g selects, from among the scaled applications scaled out to the other region 4, the scaled application with the smallest evaluation score $S^{A,R}$.

Next, in step S32C, the performance threshold excess detection unit 411j refers to the resource usage status history table 412g (FIG. 12) and predicts whether or not the controller will exceed the performance threshold value if the APP selected in step S31C is returned to its own region. If it is predicted that the performance threshold value will be exceeded (step S32C: YES), the performance threshold excess detection unit 411j proceeds to the processing in step S31C; and if it is predicted that the performance threshold value will not be exceeded (step S32C: NO), the performance threshold excess detection unit 411j proceeds to the processing in step S33C. It should be noted that, if it is predicted that the performance threshold value will be exceeded (step S32C: YES), the performance threshold excess detection unit 411j may proceed to the processing in step S38 instead of step S31C and determine whether any other scaled applications exist.

FIG. 13 is a diagram illustrating an example of the configuration of the resource usage status history table 412g. The resource usage status history table 412g is included in the table group 412 of the memory 41M. The resource usage status history table 412g has columns for APP #, scaling source region #, resource utilization rate: CPU, resource utilization rate: memory, and so on, and records the region # and the resource usage status for each APP that apply before scaling. During the determination processing in step S32C, the performance threshold excess detection unit 411j adds the pre-scaling resource usage status of the controller 42 recorded in the resource usage status history table 412g to the current usage status. In this way, a prediction is made with respect to whether the controller usage status of the relevant region will exceed the performance threshold value when the relevant APP is returned to its pre-scaling region.

In step S33C, the deployment processing unit 411g issues an instruction to the APP migration processing unit 411i to return the selected APP to its pre-scaling region, and issues an instruction to the scaling processing unit 411h to scale in the controller of the scaling destination.

Next, in step S38, the deployment processing unit 411g judges whether or not any other scaled application exists, and returns the processing to step S31C if one does exist (step S38: YES), or terminates the regular APP redeployment processing if it does not exist (step S38: NO). In step S31C, which is the processing executed following step S32C or step S38, the target of the processing becomes, other than the evaluation score(s) $S^{A,R}$ that was selected previously the scaled application with the smallest evaluation score $S^{A,R}$.

(Processing for Applying Laws When New Region Is Added) When a new region is added, setting new settings for all of the laws or the rules for the additional region is burdensome and time-consuming. Therefore, the burden of setting the laws or the rules for the additional region is reduced by propagating the existing laws or rules based on geographical information. Geographical information can be acquired from Geolocation based on IP addresses such as GeoIP, a GPS (Global Positioning System), or manual settings, and so on.

Figure 14:
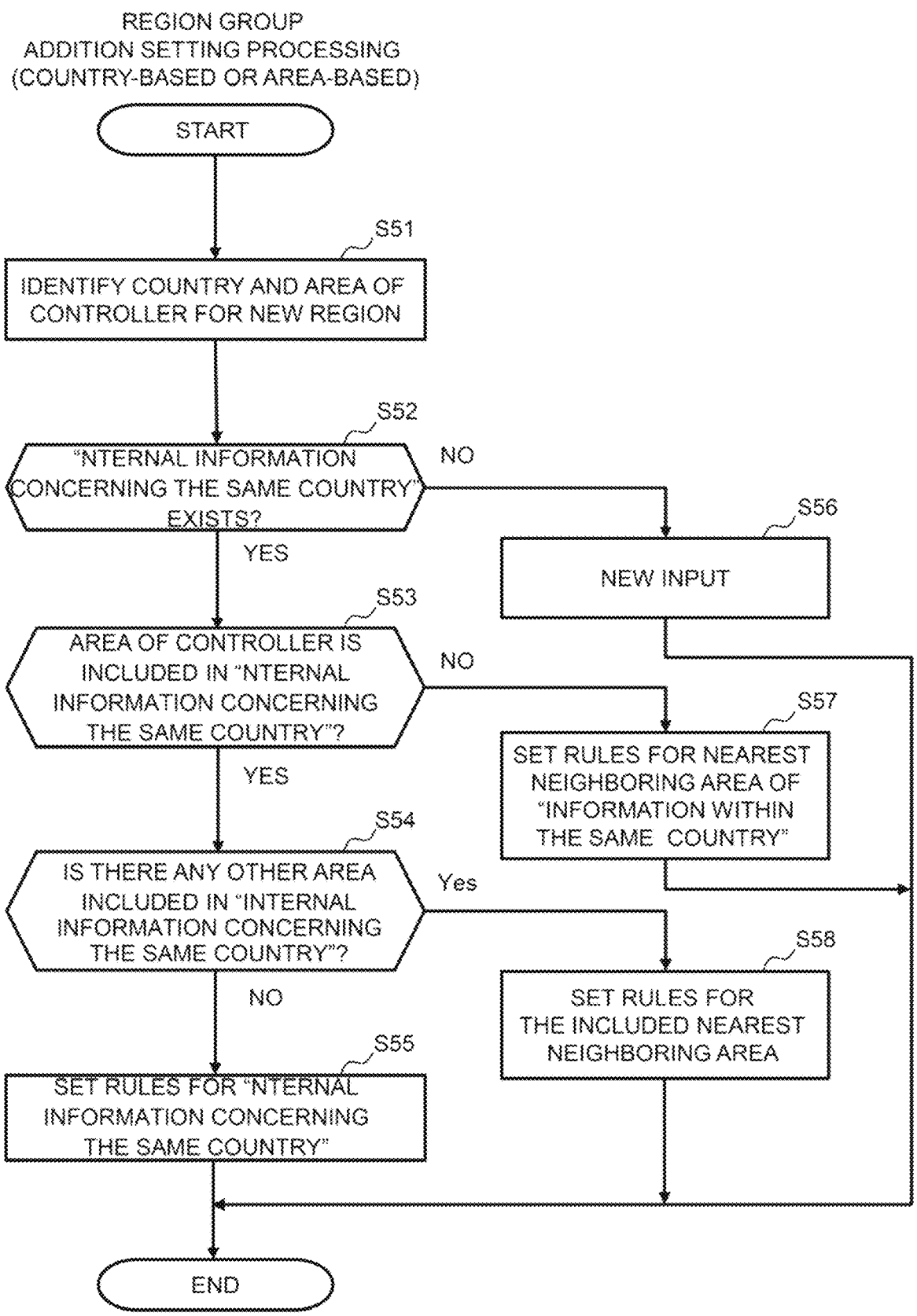
FIG. 14 is a flowchart illustrating an example of region group addition setting processing (country-based and area-based) according to the embodiment.

FIG. 14 is a flowchart illustrating an example of region group addition setting processing (country-based and area-based) according to the embodiment. FIG. 15 is an explanatory diagram for explaining the region group addition setting processing (country-based and area-based) according to the embodiment.

The law/rule application unit 411k of the administrative server 41 of each region 4 executes the region group addition setting processing (in units of country/area) when it recognizes, for example, via IP communication, that a new region 4 has been added.

In step S51, the law/rule application unit 411k identifies the country and the area of the controller 42 for the new region 4 based on geographical information. In step S52, the law/rule application unit 411k determines whether or not there is "internal information concerning the same country" as the country identified in step S51. If there is "internal information concerning the same country" (step S52: YES), the law/rule application unit 411k proceeds to the processing in step S53; and if there is no "internal information concerning the same country" (step S52: NO), the law/rule application unit 411k proceeds to the processing in step S56.

In step S53, the law/rule application unit 411k determines whether or not the area of the controller identified in step S51 is included in the "internal information concerning the same country." If the area of the controller identified in step S51 is included in the "internal information concerning the same country" (step S53: YES), the law/rule application unit 411k proceeds to the processing in step S54; and if there is no "internal information concerning the same country" (step S53: NO), the law/rule application unit 411k proceeds to the processing in step S57.

In step S54, the law/rule application unit 411k determines whether or not there is any other area(s) included in the "internal information concerning the same country." If there is another area(s) included in the "internal information concerning the same country" (step S54: YES), the law/rule application unit 411k proceeds to the processing in step S58; and if there is no other area included in the "internal information concerning the same country" (step S54: NO), the law/rule application unit 411k proceeds to the processing in step S55.

In step S55, the law/rule application unit 411k sets the laws or the rules of the "internal information concerning the same country" identified in stepS52 to apply as settings for the additional region. As illustrated in FIG. 15(a), for the additional region B=Tokyo (JP), "internal information concerning the same country" (region A=JP) exits (step S52: YES). Furthermore, the area of the controller (region B=Tokyo (JP)) is contained within the "internal information concerning the same country" (region A=JP)(step S53: YES). In addition, there is no other area included in the "internal information concerning the same country" (region A=JP) (Step S54: NO). Accordingly, in step S55, the laws or the rules of the region A=JP are propagated and set to apply to the region B.

In step S56, as there is no existing information for the laws or the rules relating to the country and the area for the new region, the law/rule application unit 411k inputs new information.

In step S57, the law/rule application unit 411k sets the rules for a nearest neighboring area to the additional region in the "internal information concerning the same country" to apply as settings for the additional region. As illustrated in FIG. 15(b), for the additional region C=Osaka (JP), "internal information concerning the same country" (region B=Tokyo (JP)) exits (step S52: YES). Furthermore, the area of the controller (region C=Osaka (JP)) is not contained within the "internal information concerning the same country" (region B=Tokyo (JP)) (step S53: NO). Accordingly, in step S57, the laws or the rules of the nearest neighboring region B=Tokyo (JP) are propagated and set to apply to the region C. However, rules are put in place with respect to determination regarding being a nearest neighbor, such as being within the same country or within the same economic zone such as the European Union (EU).

In step S58, the law/rule application unit 411k sets the rules for the nearest neighboring other area of the included new region to apply as settings for the additional region. As illustrated in FIG. 14(c), for the new region C=Osaka (JP), "internal information concerning the same country" (region B=Tokyo (JP)) exits (step S52: YES). Furthermore, the area of the controller (region C=Osaka (JP)) is contained within the "internal information concerning the same country" (region A=JP) (step S53: YES). Furthermore, there is another area (region B=Tokyo (JP)) included in the "internal information concerning the same country" (region A=JP) (Step S54: NO). Therefore, in order to apply stricter rules, in step S58 the rules of the nearest neighbor, the region B=Tokyo(JP), are propagated and set to apply to the region C.

(Variation of Information Setting Processing When Adding New Region) In FIG. 14 and FIG. 15, explanations were provided for propagation of the rules in units of a country or an area, but the same propagation of the rules can be applied using an organization such as a company. An explanation will be given below as Variation 3, concerning the automatic setting of internal company rules, etc., when the same kind of region addition takes place. Geographical information can be acquired from Geolocation or Whois information based on IP addresses, such as GeoIP, etc.

Figure 16:
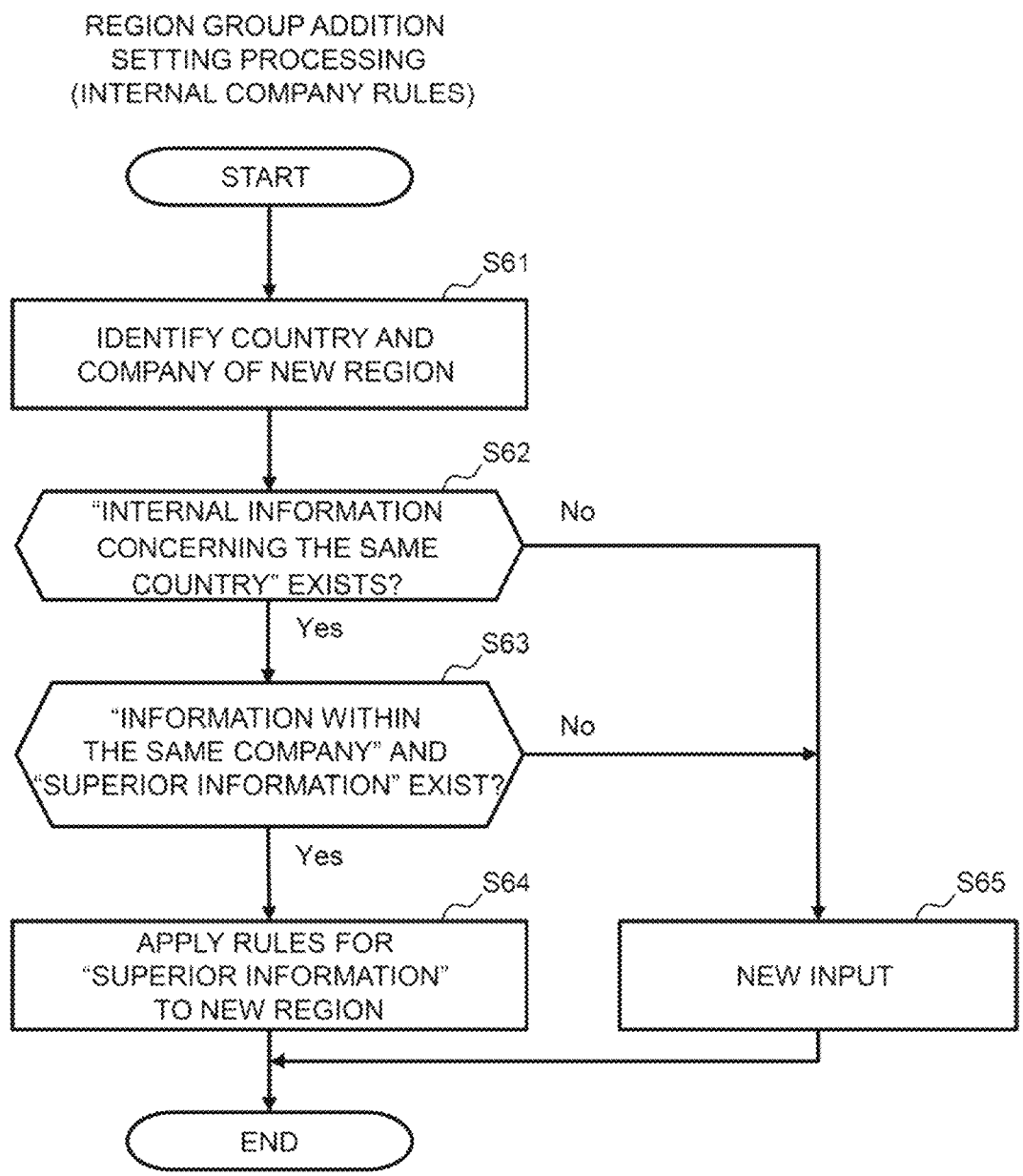
FIG. 16 is a flowchart illustrating an example of region group addition setting processing (internal company rules) according to Variation 3.
Figure 17:
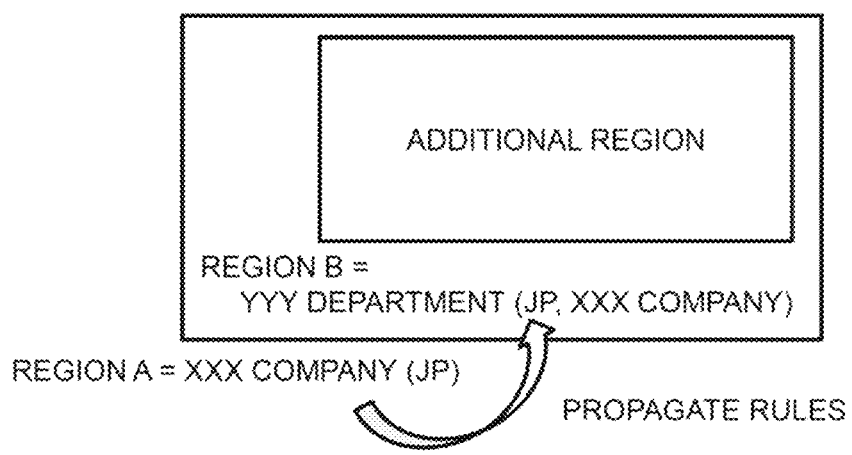
FIG. 17 is an explanatory diagram for explaining the region group addition setting processing (internal company rules) according to Variation 3.

FIG. 16 is a flowchart illustrating an example of the region group addition setting processing (internal company rules) according to Variation 3. FIG. 17 is an explanatory diagram for explaining the region group addition setting processing (internal company rules) according to the embodiment.

In step S61, the law/rule application unit 411k identifies the country and the company of the additional region from the geographical information. Next, in step S62, the law/rule application unit 411k determines whether or not there is "internal information concerning the same country." If there is "internal information concerning the same country" (step S62: YES), the law/rule application unit 411k proceeds to the processing in step S63; and if there is no "internal information concerning the same country" (step S62: NO), the law/rule application unit 411k proceeds to the processing in step S65. GeoIP and Whois information can be used together to determine if an area is in the same country and in the same company.

Next, in step S63, the law/rule application unit 411k determines whether or not "within same company" and "superior information" exist. If "within same company" and "superior information" exist, (step S63: YES), the law/rule application unit 411k proceeds to the processing in step S64; and if "within same company" and "superior information" do not exist (step S63: NO), the law/rule application unit 411k proceeds to the processing in step S65.

In step S64, the law/rule application unit 411k sets the rules for "superior information" to apply to the additional region. As illustrated in FIG. 17, for the additional region B=YYY Department (JP, XXX Company), there is "internal information concerning the same country" (region A=XXX Company (JP)) (step S62: YES), along with "information within the same company" and "superior information" (region A=XXX Company(JP)) (step S63: YES). Accordingly, in step S64, the rules of the region A=XXX Company(JP) of the "superior information" are propagated and set to apply to the region B.

In step S65, the law/rule application unit 411k inputs new rule information for the additional region.

(Scaling Permission Table Automatic Update Processing) An example of automatic rule updating in the scaling permission table 412a will be explained below. For example, when the country-based category under the export control laws has been changed, or when the applicability judgment needs to be re-executed due to a change in foreign exchange and foreign trade laws, the rule data retained by the administrative server 41 will be updated and the scaling destination settings will be changed automatically.

Figure 18:
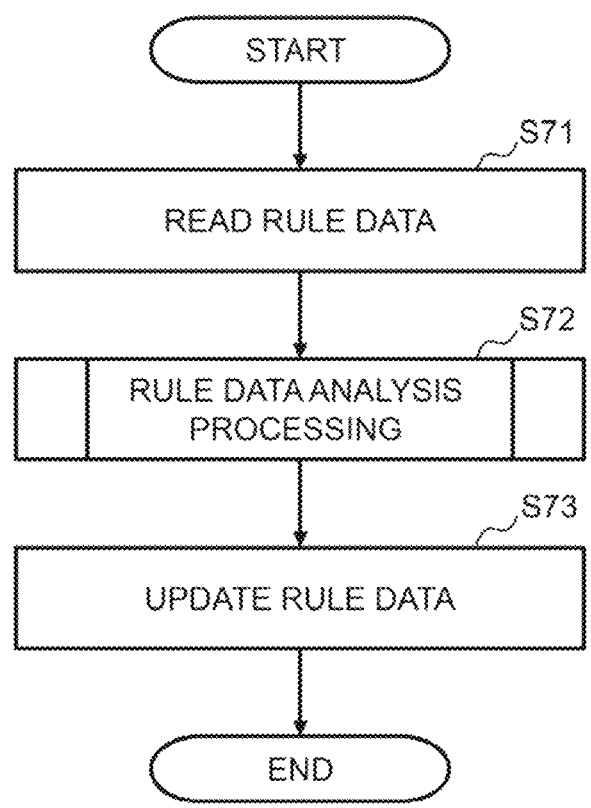
FIG. 18 is a flowchart illustrating an example of automatic update processing for the scaling permission table according to the embodiment.
Figure 19:
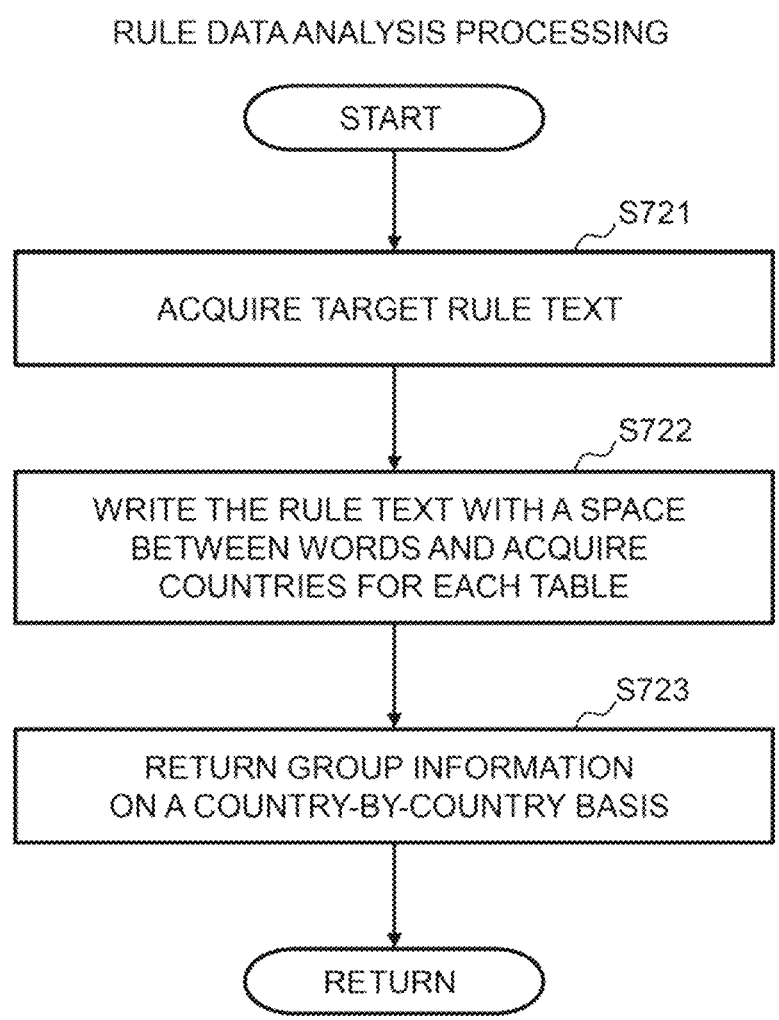
FIG. 19 is a flowchart illustrating an example of rule data analysis processing.
Figure 20:
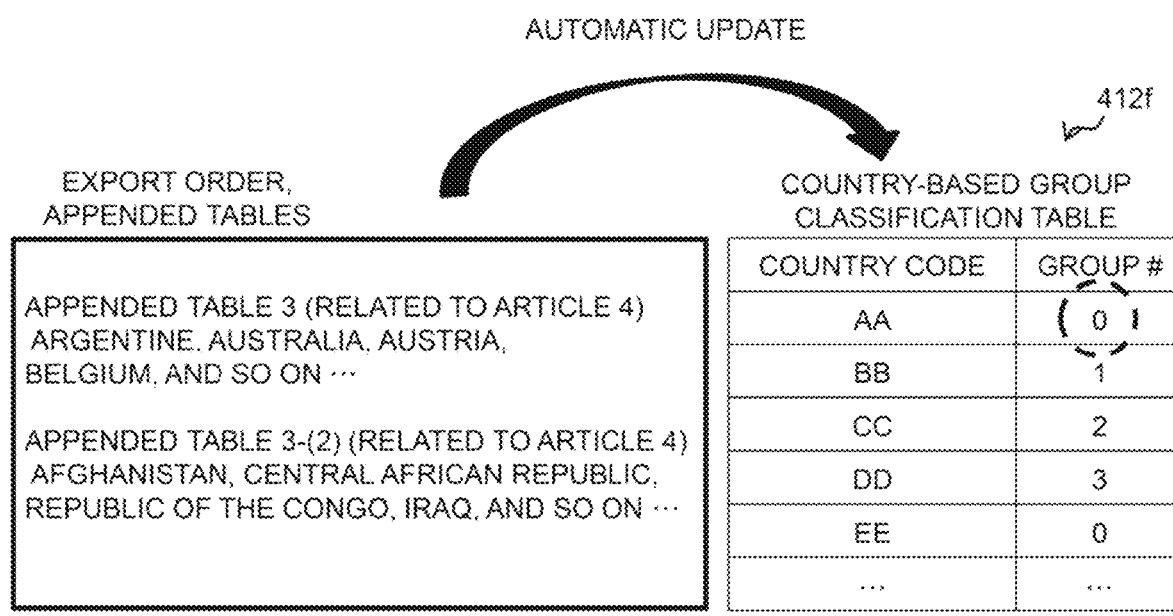
FIG. 20 is an explanatory diagram for explaining the rule data analysis processing according to the embodiment.

FIG. 18 is a flowchart illustrating an example of automatic update processing for the scaling permission table 412a according to the embodiment. FIG. 19 is a flowchart illustrating an example of the rule data analysis processing in step S72 of FIG. 18. FIG. 19 is an explanatory diagram for explaining the rule data analysis processing. FIG. 20 is an explanatory diagram for explaining the automatic update processing for the scaling permission table according to the embodiment.

In step S71, the scaling permission table update unit 411m reads in the rule data. The rule data is text data of articles/provisions of the laws or the rules. Next, in step S72, the scaling permission table update unit 411m executes the rule data analysis processing, which will be described later with reference to FIG. 19. Next, in step S73, the scaling permission table update unit 411m updates the rule data stored in a specified storage area in group information for each country.

In the rule data analysis processing of step S72, as illustrated in FIG. 19, in step S721, the scaling permission table update unit 411m acquires the target article from the rule data read in step S71. Next, in step S722, the scaling permission table update unit 411m writes the text of the target article read in step S721 with a space between words and acquires the countries for each table. Next, in step S723, the scaling permission table update unit 411m returns the group information for each country acquired in step S722.

Figure 21:
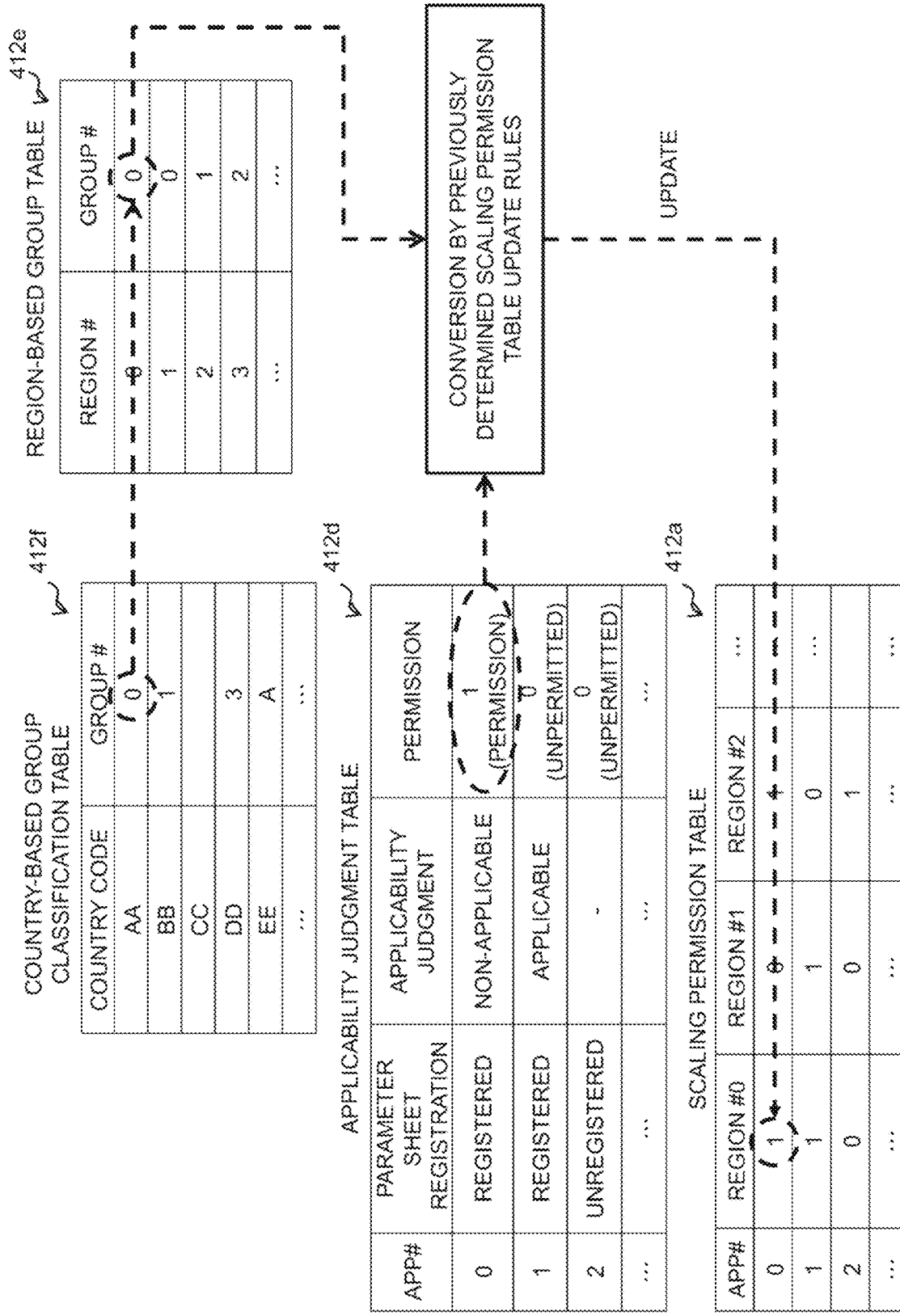
FIG. 21 is an explanatory diagram for explaining the automatic update processing for the scaling permission table according to the embodiment.

As illustrated in FIG. 20, it is assumed that, for example, the group # of the country code AA is changed from 1 to 0, based on rule data that has been updated (separate export order table in FIG. 20). As illustrated in FIG. 20 and FIG. 21, if the group # of the country code=AA in the country-based group classification table 412f is changed to 0, and if the region #0 of the region-based group table 412e belongs to the country code=AA, the group # is updated to 0. Then, using the group # in the region-based group table 412e and the parameter sheet registration and the applicability judgment columns in the applicability judgment table 412d, an update from 0 to 1 is made, according to the predefined rules, for the corresponding part in the scaling permission table 412a in the region # for which the group # has been updated. In the same way that, according to the predetermined rules, for example, the result is "1" (permitted) if the group #=0, the parameter sheet registration=registered, and the applicability judgment=non-applicable, the value stored in the scaling permission table 412a is determined with reference to the applicability judgment table 412d, and based on the combination of the region # and APP # included in the changed group #. The scaling permission table 412a is automatically updated by obtaining the value on the permission column corresponding to the combination of the APP #, the parameter sheet registration, and the applicability judgment in the applicability judgment table 412d.

In the embodiment described above, the performance information required from the viewpoint of compliance with the laws and the rules and with respect to the other region as the scale-out destination is incorporated into the reliability score, the validity of the selection of the other region as the scale-out destination is incorporated into the declaration score, and based on these, the region and APP with the highest evaluation score are selected as the scale-out destination. Therefore, in a situation where there are many options for the region 4 for the scale-out destination based on various perspectives, scaling-out that selects the appropriate scale-out destination region in a timely manner can be performed automatically at low cost, while also maintaining the security of the regions without moving internal information to the outside, and taking into account such factors as mutual compliance with laws, operating cost, operating risk, and equipment performance, etc.

It should be noted that in the embodiment above, the explanation was provided to indicate that the administrative server 41 in a single region 4 manages a single controller 42. However, the administrative server 41 in a single region 4 may sometimes manage a plurality of the controllers 42. In this case, the administrative server 41 may manage the scale-out and scale-in for each of the controllers 42, or it may manage the scale-out and scale-in using the plurality of the controllers 42 under its control as a unit.

Furthermore, in the embodiment described above, the explanation was provided to indicate that the region 4 has a three-tier configuration consisting of the administrative server 41, the controller 42, and the storage device 43; however, the present invention is also applicable to CI (Converged Infrastructure) and HCI (Hyper-Converged Infrastructure) configurations.

The present invention is not limited to the embodiments described above, and includes various variations. For example, the embodiments described above provide a detailed explanation of the present invention in order to make it easier to understand, and do not necessarily limit it to embodiments including all of the explained configurations. Furthermore, so long as there is no incompatibility, part of the configuration of one embodiment may be replaced with the configuration of another embodiment, and the configuration of one embodiment may have the configuration of another embodiment added to it. Furthermore, addition, deletion, replacement, integration, or distribution of a configuration may also apply with respect to a part of the configuration of each embodiment. In addition, the configurations and processing indicated in the embodiments can be distributed, integrated, or replaced as appropriate based on processing efficiency or implementation efficiency.

REFERENCE SIGNS LIST

1: storage system
3: administrative client
4: region
5: website
41: administrative server
42: controller
43: storage device

The invention claimed is:

1. A storage system configured by including a plurality of computer systems coupled together via a network,
   wherein each of the computer systems includes an administrative server and a controller that controls execution of execution targets including at least either one of an application, a virtual machine, and a container, and collects an operation status of resources to be used to execute the execution targets; and
   wherein the administrative server judges whether the operation status exceeds a threshold value or not; and
   if the administrative server detects that the operation status exceeds the threshold value,
   the administrative server:
   calculates a first index for each of the execution targets on a basis of information about at least either one of cost, credibility, and performance when the execution target which operates in one of the computer systems is migrated to another one of the computer systems and is caused to operate in an other computer system, and indexing information which indicates laws or rules applied to the computer system by using indexes;

acquires, from the other computer system, a second index which uses a dimensionless quantity to indicate a degree of selection of the other computer system as a migration destination of the execution target; and decides the computer system which is the migration destination of the execution target from among the plurality of computer systems other than the one computer system on the basis of either one or both of the first index and the second index.

2. The storage system according to claim 1, wherein the administrative server decides the computer system, which is the migration destination, and the execution target to be migrated on the basis of at least the first index.

3. The storage system according to claim 1, wherein the administrative server:

calculates the second index which indicates the degree of selection of the computer system as the migration destination of the execution target which operates in the other computer system; and transmits the calculated second index to the other computer system upon request.

4. The storage system according to claim 1, wherein the administrative server:

scales out the controller for the computer system which is a migration source to the computer system which is the migration destination; and migrates the execution target that operates in the computer system, which is the migration source, and causes the execution target to operate in the computer system which is the migration destination.

5. The storage system according to claim 4, wherein the administrative server:

causes the execution target that operates in the computer system, which is the migration destination, to return to, and operate in, the computer system which is the migration source; and scales in the controller which has been scaled out.

6. The storage system according to claim 4, wherein the administrative server:

saves, as a history, the operation status when migrating the execution target that operates in the computer system which is the migration source;

predicts, based on the history, whether the operation status exceeds the threshold value or not if the execution target that operates in the computer system which is the migration destination is caused to return to, and operate in, the computer system which is the migration source; and causes the execution target that operates in the computer system which is the migration destination to return to, and operate in, the computer system which is the migration source, and scales in the controller which has been scaled out if it is predicted that the operation status does not exceed the threshold value.

7. The storage system according to claim 4, wherein the administrative server:

causes the execution target that operates in the computer system which is the migration destination to return to, and operate in, the computer system which is the migration source; and judges whether the operation status exceeds the threshold value or not; and if the operation status does not exceed the threshold value, the administrative server recalculates the first index, reacquires the second index, and decides a computer system which is a re-migration destination of the execution on the basis of either one or both of the first index and the second index; if the re-migration destination matches the migration destination, the administrative server migrates the execution target which operates in the computer system and causes the execution target to operate in the computer system which is the migration destination; and if the re-migration destination does not match the migration destination, the administrative server scales out the controller for the computer system to the computer system which is the re-migration destination, migrates the execution target which operates in the computer system and causes the execution target to operate in the computer system which is the re-migration destination, and scales in the controller which has been scaled out to the computer system which is the migration destination.

8. The storage system according to claim 1, wherein the administrative server:

acquires new information about geography or organization of the computer system which is newly added to the storage system;

compares the new information with existing information about geography or organization of the computer systems which are existing in the storage system;

applies the laws or the rules, which are applied to the existing computer systems, to the new computer system according to an inclusion relationship and positional relationship between the new information and the existing information.

9. The storage system according to claim 1, wherein the administrative server:

retains law/rule data which turns description details of the laws or the rules into data, the indexing information used when calculating the first index, and judgment rules for judging an index value to be stored in the indexing information on the basis of the description details of the law/rule data; and updates the law/rule data on the basis of an analysis result of the description details of the laws or the rules and updates the index value of the indexing information on the basis of update content of the law/rule data and the judgment rules.

10. The storage system according to claim 1, wherein the administrative server accepts, via a specified input screen, the information about at least either one of the cost, the credibility, and the performance, and possibility information about whether or not each of the computer systems is configured to be decided as the computer system which is the migration destination, according to the laws or the rules, and generates the indexing information from the possibility information.

11. A load distribution method for a storage system configured by including a plurality of computer systems coupled together via a network, wherein each of the computer systems includes an administrative server and a controller that controls execution of execution targets including at least either one of an application, a virtual machine, and a container, and collects an operation status of resources to be used to execute the execution targets; and wherein the administrative server judges whether the operation status exceeds a threshold value or not; and if the administrative server detects that the operation status exceeds the threshold value, the administrative server:

calculates a first index for each of the execution targets on a basis of information about at least either one of cost, credibility, and performance when the execution target which operates in one of the computer systems is migrated to another one of the computer systems and is caused to operate in an other computer system, and indexing information which indicates laws or rules applied to the computer system by using indexes;

acquires, from the other computer system, a second index which uses a dimensionless quantity to indicate a degree of selection of the other computer system as a migration destination of the execution target; and decides the computer system which is the migration destination of the execution target from among the plurality of computer systems other than the one computer system on the basis of either one or both of the first index and the second index.

* * * * *